(12) United States Patent
Huang et al.

(10) Patent No.: US 11,622,435 B2
(45) Date of Patent: Apr. 4, 2023

(54) LIGHTING DEVICE AND POWER SWITCHING CIRCUIT

(71) Applicant: APUTURE IMAGING INDUSTRIES CO., LTD., Guangdong (CN)

(72) Inventors: Yi Huang, Guangdong (CN); Xiangjun Zhou, Guangdong (CN)

(73) Assignee: APUTURE IMAGING INDUSTRIES CO., LTD., Guangdong (CN)

(*) Notice: Subject to any disclaimer, the term of this patent is extended or adjusted under 35 U.S.C. 154(b) by 0 days.

(21) Appl. No.: 17/555,599

(22) Filed: Dec. 20, 2021

(65) Prior Publication Data
US 2022/0210893 A1 Jun. 30, 2022

(30) Foreign Application Priority Data
Dec. 29, 2020 (CN) .......................... 202011593313.4

(51) Int. Cl.
*H05B 47/10* (2020.01)
*H05B 47/17* (2020.01)
*H02J 1/10* (2006.01)

(52) U.S. Cl.
CPC .............. *H05B 47/17* (2020.01); *H02J 1/102* (2013.01)

(58) Field of Classification Search
CPC .... H05B 45/37; H05B 45/3725; H05B 47/17; H05B 45/00; H05B 47/00; H05B 47/10;
(Continued)

(56) References Cited

U.S. PATENT DOCUMENTS 4,672,227 A 6/1987 Lagree et al.
9,178,385 B2 * 11/2015 Chen ...................... H02J 9/06
(Continued)

FOREIGN PATENT DOCUMENTS

CN 1553554 A 12/2004
CN 101702536 A 5/2010
(Continued)

OTHER PUBLICATIONS

The First Office Action and Search Report dated Jun. 15, 2021, for Aputure Imaging Industries Co., Ltd., from China Application No. 202011593313.4 and Its Translation of Office Action Into English (15 pages).
(Continued)

*Primary Examiner* — Thai Pham
(74) *Attorney, Agent, or Firm* — Mark M. Friedman

(57) ABSTRACT

The present disclosure provides a lighting device and a power switching circuit. The power switching circuit of the lighting device includes a plurality of power input circuits and a logic control circuit. The logic control circuit is configured to receive a first electrical signal, a second electrical signal, or a third electrical signal, and control a first-switching circuit electrically connected with an Nth power input terminal to be turned on according to the first electrical signal, control the first-switching circuit electrically connected with the Nth power input terminal to be turned off according to the second electrical signal, and control a first-switching circuit electrically connected with first to (N−1)th power input terminals to be turned off according to the third electrical signal; N is a positive integer less than or equal to a number of the power input circuits.

20 Claims, 9 Drawing Sheets

(58) Field of Classification Search
CPC . H05B 47/105; H02J 1/10; H02J 1/102; H02J 1/108

See application file for complete search history.

(56) References Cited

U.S. PATENT DOCUMENTS

2010/0127569 A1   5/2010  Dai
2011/0095810 A1*  4/2011  Weng .................. H03K 17/78
                                                327/493

FOREIGN PATENT DOCUMENTS

| CN | 101771292 | A | * | 7/2010 |
| CN | 101771292 | A |   | 7/2010 |
| CN | 102393893 | A |   | 3/2012 |
| CN | 103094980 | A |   | 5/2013 |
| CN | 206323123 | U |   | 7/2017 |
| CN | 206962524 | U |   | 2/2018 |
| CN | 108287502 | A |   | 7/2018 |
| CN | 109638936 | A | * | 4/2019 |
| CN | 109638956 | A |   | 4/2019 |
| CN | 209298981 | U |   | 8/2019 |

OTHER PUBLICATIONS

"Power Electronics," by Zhaoan Wang, published on Nov. 30, 2015, p. 145.

* cited by examiner

LIGHTING DEVICE AND POWER SWITCHING CIRCUIT

FIELD OF INVENTION

The present disclosure generally relates to lighting technical field, in particular to a lighting device, and a power switching circuit.

BACKGROUND OF INVENTION

Generally, a light source of a lighting device is powered by a variety of power supplies, such as utility power and batteries. When one of the power supplies is turned off, the power supply is switched by a power switching circuit, so that the light source is powered by another power supply, thus to ensure stable operation of the lighting device.

In order to reduce electricity cost of the lighting device and improve service life of the lighting device, utility power is preferred to supply power by the power switching circuit. When the utility power is turned off, the power switching circuit switches to battery or other power supplies to supply power.

However, when a battery supplies power to the light source, a power input terminal electrically connected with the utility power and the light source may be in a conducting state to cause electric current supplied by the battery to flow reversely into an power input terminal of the utility power from the power input terminal of the power switching circuit, causing the lighting device to operate unstably.

SUMMARY OF INVENTION

The present disclosure a lighting device, and a power switching circuit, which aims to improve working stability of the lighting device.

An embodiment of the present disclosure provides a lighting device, comprising a light source and a power switching circuit, wherein the power switching circuit comprises:

a plurality of power input circuits, wherein each of the power input circuits comprises a power input terminal, and a first-switching circuit connected in series between the power input terminal and the light source; and a logic control circuit, wherein the logic control circuit is electrically connected with power input terminals of the plurality of power input circuits and the first-switching circuit;

wherein the logic control circuit is configured to receive a first electrical signal input by an Nth power input terminal and control the first-switching circuit electrically connected with the Nth power input terminal to be turned on according to the first electrical signal;

wherein the logic control circuit is further configured to receive a second electrical signal input by any one of first to (N−1)th power input terminals and control the first-switching circuit electrically connected with the Nth power input terminal to be turned off according to the second electrical signal;

wherein the logic control circuit is further configured to receive a third electrical signal output by an output terminal of the first-switching circuit electrically connected with the Nth power input terminal and control the first-switching circuit electrically connected with the first to (N−1)th power input terminals to be turned off according to the third electrical signal;

wherein N is a positive integer less than or equal to the number of the plurality of power input circuits.

Optionally, wherein the logic control circuit comprises a plurality of switch circuits, and a number of the plurality of switch circuits is equal to a number of the plurality of first-switching circuits of the plurality of power input circuits;

an output terminal of an Nth switch circuit is electrically connected with a control terminal of an Nth first-switching circuits, an input terminal of the Nth switch circuit is electrically connected with first to the Nth power input terminals;

wherein the Nth switch circuit is configured to receive the first electrical signal and control the first-switching circuits electrically connected with the Nth power input terminal to be turned on according to the first electrical signal;

wherein the Nth switch circuit is further configured to receive the second electrical signal and control the first-switching circuit electrically connected with the Nth power input terminal to be turned off according to the second electrical signal;

the output terminal of the Nth switch circuit is electrically connected with input terminals of first to (N−1)th switch circuits, wherein any one of the first to (N−1)th switch circuits is configured to receive the third electrical signal and control the first-switching circuits electrically connected with the first to (N−1)th switch circuits to be turned off according to the third electrical signal.

Optionally, wherein the first-switching circuit comprises a switch tube assembly, the switch tube assembly comprises two switch tubes, each of the two switch tubes comprises a first terminal and a second terminal, the first terminals of the two switch tubes are connected with each other, and the second terminal of one of the two switch tubes is electrically connected with a corresponding power input terminal, and the second terminal of another one of the two switch tubes is electrically connected with the light source through the output terminal of the first-switching circuit, the output terminal of the switch circuit is electrically connected with control terminals of the two switch tubes to control the first terminals and the second terminals of the two switch tubes to be turned on or turned off.

Optionally, wherein the first-switching circuit comprises two switch tube assemblies, and the two switch tube assemblies are connected in parallel with each other.

Optionally, wherein the switch tube comprises an NMOSFET tube or a PMOSFET tube.

Optionally, wherein the logic control circuit further comprises a bias power supply circuit, an input terminal of the bias power supply circuit is electrically connected with the plurality of power input terminals, the switch circuit comprises a second-switching circuit, the second-switching circuit comprises an input terminal, a first output terminal, a second output terminal, and a control terminal, the input terminal of the second-switching circuit is electrically connected with an output terminal of the bias power supply circuit, the first output terminal of the second-switching circuit is electrically connected with a control terminal of a corresponding switch tube, the second output terminal of the second-switching circuit is electrically connected with a first terminal of a corresponding switch tube;

a control terminal of an Nth second-switching circuit is electrically connected with the first to Nth power input terminal, the control terminal of the Nth second-switching circuit is configured to receive the first electrical signal and control an input terminal and a first output terminal of the Nth second-switching circuit to be turned on;

the control terminal of the Nth second-switching circuit is configured to receive the second electrical signal and control a first output terminal and a second output terminal of the Nth second-switching circuit to be turned on according to the second electrical signal;

a second terminal of the of a switch tube of the Nth first-switching circuit is electrically connected with control terminals of first to (N−1)th second-switching circuits, the control terminals of the first to (N−1)th second-switching circuits are configured to receive the third electrical signal and control the first output terminal and the second output terminal of the Nth second-switching circuit to be turned on according to the third electrical signal.

Optionally, wherein the second-switching circuit comprises a first switch and a second switch, an input terminal of the first switch is electrically connected with the output terminal of the bias power supply circuit, an output terminal of the first switch is electrically connected with a control terminal of a corresponding switch tube and an input terminal of the second switch, an output terminal of the second switch is electrically connected with a first terminal of a corresponding switch tube;

a control terminal of an Nth first switch is electrically connected with the Nth power input terminal, the control terminal of the Nth first switch is configured to receive the first electrical signal and control an input terminal and an output terminal of the Nth first switch to be turned on according to the first electrical signal;

an control terminal of an Nth second switch is electrically connected with the first to (N−1)th power input terminals, the control terminal of the Nth second switch is configured to receive a second electrical signal and control an input terminal and an output terminal of the Nth second switch to be turned on according to the second electrical signal;

the second terminal of the switch tube of the Nth first-switching circuit is electrically connected with control terminals of first to (N−1)th second switches, a control terminal of any one of the first to (N−1)th second switches is configured to receive the third electrical signal and control an output terminal and an input terminal of the any one of the control terminal of the first to (N−1)th second switch to be turned on according to the third electrical signal.

Optionally, wherein the first switch comprises a first optocoupler, and the second switch comprises a second optocoupler.

Optionally, wherein the bias power supply circuit comprises a monostable multivibrator circuit, a charge pump circuit, and a slow start circuit, an input terminal of the monostable multivibrator circuit is electrically connected with the plurality of power input terminal, and an output terminal of the monostable multivibrator circuit is electrically connected with an input terminal of the charge pump circuit, an output terminal of the charge pump circuit is electrically connected with an input terminal of the slow start circuit, an output terminal of the slow start circuit is electrically connected with the input terminal of the second-switching circuit.

An embodiment of the present disclosure further provide a power switching circuit, comprising:

a plurality of power input circuits, wherein each of the power input circuits comprises a power input terminal and a first-switching circuit, an input terminal of the first-switching circuit is electrically connected with the power input terminal, output terminals of the first-switching circuits of the plurality of power input circuits are electrically connected with each other; and a logic control circuit, wherein the logic control circuit is electrically connected with the power input terminals of the plurality of power input circuits;

wherein the logic control circuit is configured to receive a first electrical signal input by an Nth power input terminal and control the first-switching circuit electrically connected with the Nth power input terminal to be turned on according to the first electrical signal;

wherein the logic control circuit is further configured to receive a second electrical signal input by any one of first to (N−1)th power input terminals and control the first-switching circuit electrically connected with the Nth power input terminal to be turned off according to the second electrical signal;

wherein the logic control circuit is further configured to receive a third electrical signal output by an output terminal of the first-switching circuit electrically connected with the Nth power input terminal and control the first-switching circuit electrically connected with the first to (N−1)th power input terminals to be turned off according to the third electrical signal;

wherein N is a positive integer less than or equal to the number of the plurality of power input circuits.

In the lighting device provided by the embodiment of the present disclosure, the logic control circuit is disposed between the plurality of the power input terminals and the input terminal of the light source, so that, in a condition that the logic control circuit receives the first electrical signal input by the Nth power input terminal, and the second electrical signal input by any one of the first to (N−1)th power input terminals has not been received, the logic control circuit controls the first-switching circuit electrically connected with the Nth power input terminal to be turned on, and the light source is powered by the power supply electrically connected with the Nth power input terminal. In a condition that the logic control circuit receives a second electrical signal input by any one of the first to (N−1)th power input terminals, the logic control circuit controls the first-switching circuit electrically connected with the Nth power input terminal to be turned off according to the second electrical signal, so that the light source is powered by the power supply electrically connected with the power input terminal which input the second electrical signal. So that it can be ensured that after the power input terminal of the high priority power input circuit of the lighting device is electrically connected with the power supply, the logic control circuit can control the low priority power input circuit to be in an off state.

Meanwhile, the logic control circuit can receive a third electrical signal output by the output terminal of the first-switching circuit electrically connected with the Nth power input terminal, and control the first-switching circuits electrically connected with the first to (N−1)th power input terminals to be turned off according to the third electrical signal, so that it can be ensured that when the power supply electrically connected with the Nth power input terminal is supplying power for the light source, the first-switching circuits of the first to (N−1)th power input circuits are in off states, that is, after the low priority power input circuit is electrically connected with the power supply and supplies power to the light source, the first-switching circuit of the high priority power input circuit is in an off state, so that when the voltage input by the high priority power input terminal is lower than the voltage input by the low priority power input terminal, and the voltage difference is smaller than the present threshold, the first-switching circuit corresponding to the high priority power input terminal is in an off state and dose not supply power to the light source, meanwhile, after the power supply electrically connected with the low priority power input circuit supplies power to the light source, electric current is prevented from flowing reversely into the high priority power input circuit from the light source, thus to improve the working stability of the lighting device.

DESCRIPTION OF DRAWINGS

Technical solution and other beneficial effects of the present disclosure will be obviously through the detailed description of the specific embodiment of the present disclosure in combination with drawings.

Figure 1:
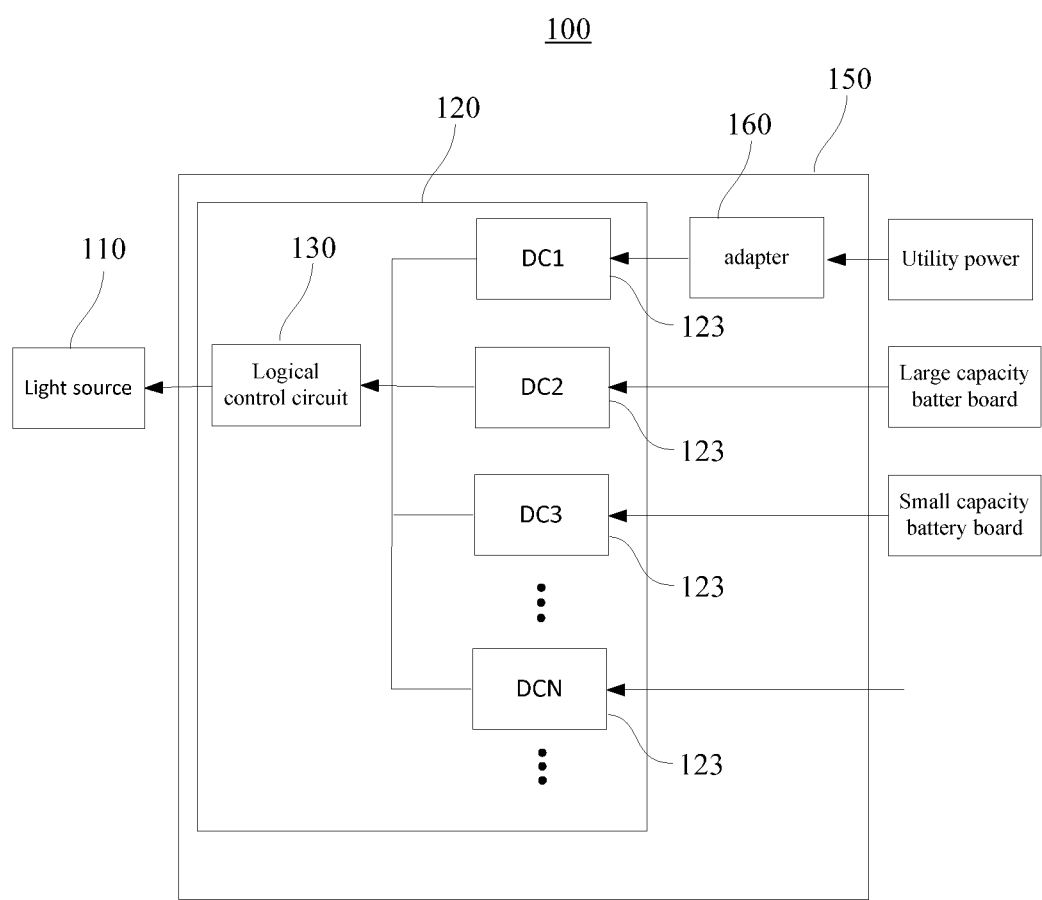
FIG. 1 is a structural schematic diagram showing a circuit structure of a lighting device provided by an embodiment of the present disclosure.

Lighting device 100; light source 110; power switching circuit 120; power input circuit 121; first-switching circuit 122; switch tube assembly 1221; power input terminal 123; logic control circuit 130; switch circuit 131; second-switching circuit 1311; first switch 1311a; second switch 1311b; bias power supply circuit 140; monostable multivibrator circuit 141; charge pump circuit 142; slow start circuit 143; control box 150; adapter 160.

DETAILED DESCRIPTION OF PREFERRED EMBODIMENTS

Technical solutions in embodiments of the present disclosure will be described clearly and completely in combination with the drawings in the embodiments of the present disclosure. Obviously, the embodiments described are only part of the embodiments of the present disclosure, not all embodiments. According to the embodiments in the present disclosure, all other embodiments obtained by those of skill in the art that the embodiments described herein without making creative work belong to the protection scope of the present disclosure.

In description of the disclosure, it should be understood that, orientational relationships represented by directional terms mentioned in the present disclosure, such as center, longitudinal, transverse, length, width, thickness, up, down, front, back, left, right, vertical, horizontal, top, bottom, inside, outside, clockwise, anticlockwise, etc., are orientational relationships based on the drawings, and are merely for the convenience of describing the present disclosure and simplifying the description, instead of indicating or implying that the device or element referred to must have a specific orientation, be constructed and operated in the specific orientation, and should not be interpreted as a limitation of the application. Furthermore, the terms "first" and "second" are used for descriptive purposes only, and cannot be understood as indicating or implying relative importance or implicitly indicating the number of technical features indicated. Thus, the features defined as "first" and "second" may explicitly or implicitly include one or more of the features. In description of the disclosure, "plurality" means two or more, unless otherwise specified.

In description of the disclosure, it should be noted that, unless there is clear regulations and limits, the terms "installation", "connection", and "connection" should be understood in a broad sense. For example, it can be fixed connection, detachable connection or integrated connection; it can be mechanical connection, electrical connection or mutual communication; it can be directly connected, or indirectly connected through intermediate media, or the internal connection of two components or the interaction relationship between two components. For those of ordinary skill in the art that the embodiments described herein, the specific meaning of the above terms in the present disclosure can be understood according to the specific situation.

In the present disclosure, unless there is clear regulations and limits, the first feature "up" or "down" of the second feature may include direct contact between the first and second features, and may also include the first and second features are not in direct contact but contacted through other feature between them. Moreover, the first feature "above" and "upper" of the second feature includes that the first feature is directly above and obliquely above the second feature, or only indicates that the horizontal height of the first feature is higher than that of the second feature. The first feature "below" and "under" of the second feature includes that the first feature is directly below and obliquely below the second feature, or only indicates that the horizontal height of the first feature is less than that of the second feature.

The following disclosure provides many different embodiments or examples to implement different structures of the present disclosure. In order to simplify the disclosure of the present disclosure, components and settings of specific examples are described below. Of course, they are only examples, and are not intended to limit the present disclosure. In addition, the present disclosure may repeat reference numerals and/or reference letters in different examples, such repetition is for the purpose of simplification and clarity, and does not indicate the relationship between the various embodiments and/or settings discussed. In addition, the present disclosure provides embodiments of various specific processes and materials, but those of ordinary skill in the art may be aware of the application of other processes and/or the use of other materials.

The embodiment of the present disclosure provides a lighting device and a power switching circuit. The following is a detailed description of them.

FIG. 1 is a structural schematic diagram of a lighting device provided by an embodiment of the present disclosure. As is shown in FIG. 1, the lighting device 100 includes a light source 110 and a power switching circuit 120. The power switching circuit 120 is configured to control different power input terminals 123 to be turned on with the light source 110 through a logic control circuit 130, so that a power supply electrically connected with the power input terminal 123 supplies power to the light source 110.

Figure 2:
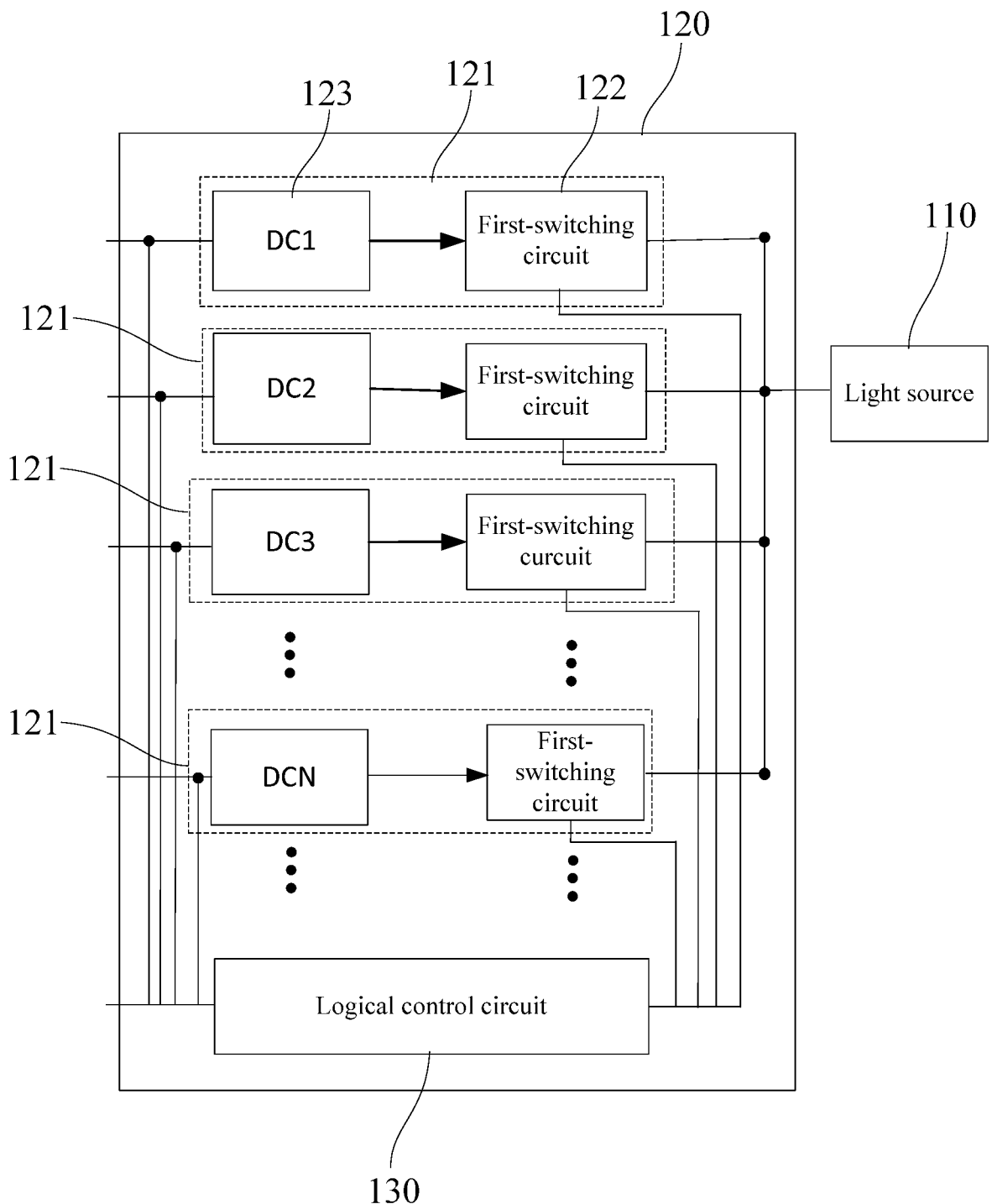
FIG. 2 is a circuit structural block diagram of a lighting device provided by an embodiment of the present disclosure.

Moreover, as is shown in FIG. 2, the lighting device 100 includes a light source 110 and a power switching circuit 120. The power switching circuit 120 includes a plurality of power input circuits 121 and the logic control circuit 130. Each of the power input circuits 121 includes a power input terminal 123 and a first-switching circuit 122. The first-switching circuit 122 is connected in series between the power input terminal 123 and the light source 110. The power input terminals 123 of the plurality of power input circuits 121 are configured to electrically connect with different types of power supplies, and supply power to the light source 110 in a condition that the first-switching circuit 122 is turned on, so as to have the light source 110 operate.

Specifically, the power supplies providing power for the lighting device 100 may be multiple types of power supplies, such as a utility power, a large capacity battery board, or a small capacity battery board. The multiple types of power supplies are electrically connected with power input terminals 123 of different power input circuits 121 respectively, and supply power to the light source 110 selectively. Certainly, an AC/DC adapter, a boost circuit, and a step-down circuit, etc. may also be disposed between the power input terminal 123 and the power supply. In addition, a number of the power supply supplying power for the lighting device 100 may be 2, 3, 4, or more, which is not limited here.

The logic control circuit 130 is electrically connected with the plurality of the power input terminals 123 and first-switching circuits 122 of the plurality of power input circuits 121. In a condition that a first electrical signal input by an Nth power input terminal 123 is received, and a second electrical signal input by any one of first to (N−1)th power input terminals 123 is not received, the logic control circuit 130 controls the first-switching circuit 122 electrically connected with the Nth power input terminal 123 to be turned on according to the first electrical signal, so that the power supply electrically connected with the Nth power input terminal 123 supplies power to the light source 110. Wherein, the N is a positive integer less than or equal to a number of the plurality of power input circuits 121.

Moreover, the logic control circuit 130 is further configured to receive a second electrical signal input by any one of the first to (N−1)th power input terminals 123, and control the first-switching circuit 122 electrically connected with the Nth power input terminal 123 to be turned off according to the second electrical signal. Thereby, in a condition that the Nth power input terminal 123 is electrically connected with the power supply, and the first to (N−1)th power input terminals 123 are not electrically connected with the power supply, the power supply electrically connected with the Nth power input terminal 123 supplies power to the light source 110. In a condition that the first to (N−1)th power input terminals 123 are electrically connected with the power supply, the first-switching circuit 122 electrically connected with the Nth power input terminal 123 is turned off, the power supply electrically connected with the Nth power input terminal 123 stops to supply power to the light source 110, and the power supplies electrically connected with the first to (N−1)th power input terminals 123 supply power to the light source 110.

Thereby, the logic control circuit 130 provided by an embodiment of the present disclosure can have the plurality of the power input circuits 121 have a priority relationship between each other, and the priority relationship is: the first power input circuit 121>the second power input circuit 121>the third power input circuit 121> . . . >the Nth power input circuit 121. That is, a priority relationship between the plurality of the power input terminals 123 is: the first power input terminal 123>the second power input terminal 123>the third power input terminal 123> . . . >the Nth power input terminal 123. When a high priority (such as the first power input terminal 123) power input circuit 121 of the lighting device 100 is electrically connected with the power supply, the logic control circuit 130 can have the power supply electrically connected with the high priority power input terminal 123 supply power to the light source 110, and have a low priority (such as the second to Nth power input terminals 123) power input circuits 121 remain in off states, the power supplies electrically connected with the low priority power input circuits 121 stop to supply power to the light source 110.

Alternatively, the logic control circuit 130 is further configured to receive a second electrical signal input by any one of the first to (N−1)th power input terminals 123, and compare the second electrical signal with the first electrical signal. In a condition that the second electrical signal is smaller than the first electrical signal, and a difference between the second electrical signal and the first electrical signal is larger than a preset threshold, the logic control circuit 130 controls the first-switching circuit 122 electrically connected with the Nth power input terminal 123 to be turned off, otherwise, the logic control circuit 130 controls the first-switching circuit 122 electrically connected with the Nth power input terminal 123 to remain in a conducting state. Thereby, in a condition that a voltage input the high priority power input terminal 123 is low, even if the high priority power input terminal 123 is electrically connected with the power supply, the first-switching circuit 122 corresponding to the high priority power input terminal 123 is turned off and does not supply power to the light source 110, but the power supply electrically connected with the low priority power input terminal 123 continues to supply power to the light source 110, thus to further ensure the working stability of the lighting device 100.

Moreover, the logic control circuit 130 is further configured to receive a third electrical signal output by an output terminal of the first-switching circuit 122 electrically connected with the Nth power input terminal 123, and control the first-switching circuit 122 electrically connected with the first to (N−1)th power input terminals 123 to be turned off according to the third electrical signal. Wherein, the N is a positive integer less than or equal to the number of the plurality of power input circuits 121.

Thereby, it can be ensured that, in a condition that the power supply electrically connected with the Nth power input circuit 121 supplies power to the light source 110, the first-switching circuits 122 of the first to (N−1)th power input circuits 121 are in off states. It is understandable that, although the priority relationship is the first power input terminal 123>the second power input terminal 123>the third power input terminal 123> . . . >the Nth power input terminal 123, if the low priority power input terminal 123 (such as the third power input terminal 123) has been turned on to supply power to the light source 110, at this time, even if the high priority power input terminal 123 (such as the first, the second power input terminal 123) is electrically connected with power supply (that is, there is a second electrical signal), while a voltage input by the high priority power input terminal 123 is lower than a voltage input by the low priority power input terminal 123, and a voltage difference is smaller than the preset threshold, the first-switching circuits 122 corresponding to the high priority power input terminal 123 (such as the first, the second power input terminal 123) is in an off state, and does not supply power to the light source 110. Meanwhile, in a condition that after the low priority power input circuit 121 is electrically connected with the power supply and supplies power to the light source 110, the first-switching circuit 122 of the high priority power input circuit 121 is in an off state, thereby, after the power supply electrically connected with the low priority power input circuit 121 supplies power to the light source 110, electric current can be prevented from flowing reversely into high priority power input circuit 121 from the light source 110, thus the working stability of the lighting device 100 is improved.

Figure 3:
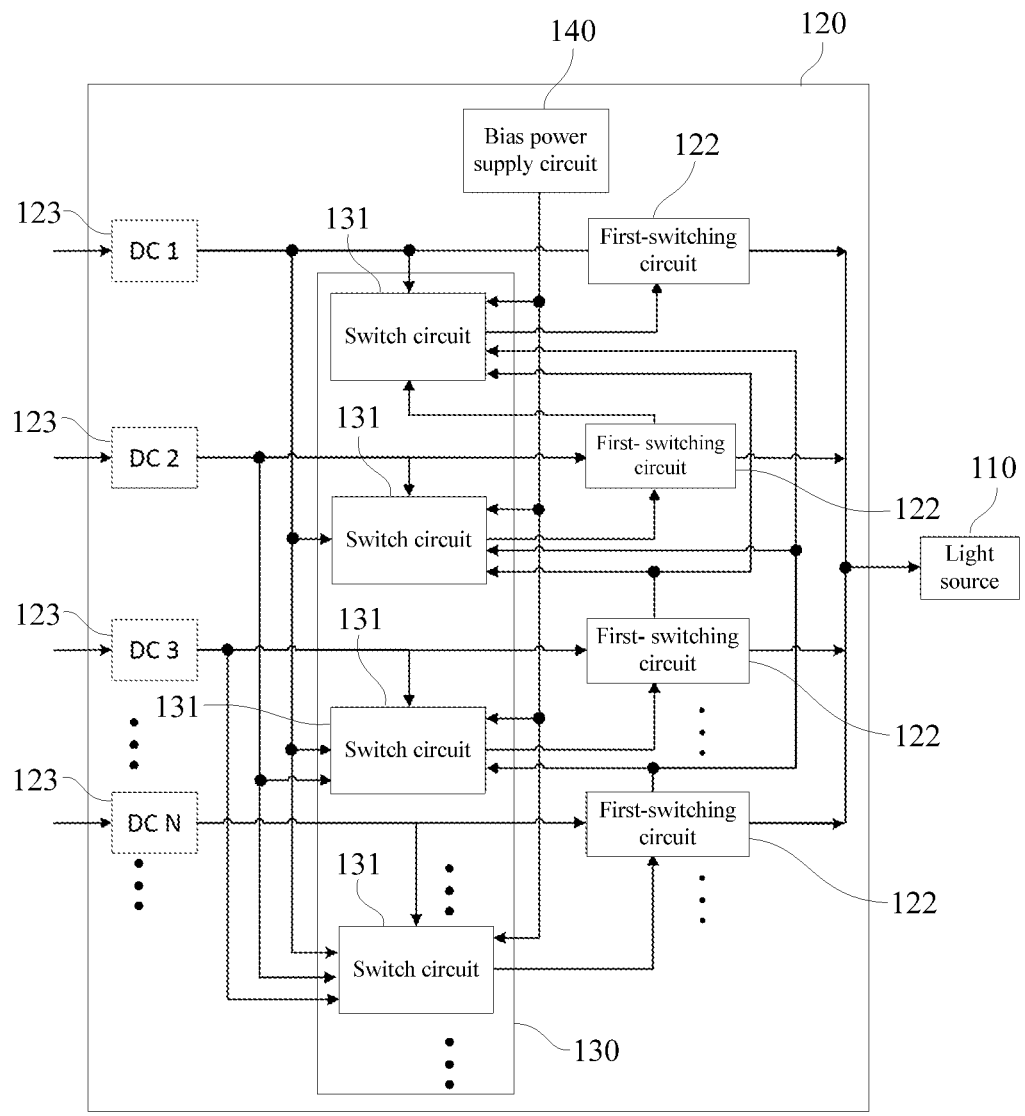
FIG. 3 is a structural schematic diagram of a power switching circuit provided by an embodiment of the present disclosure.

Alternatively, as is shown in FIG. 3, the logic control circuit 130 includes a plurality of switch circuits 131. A number of the plurality of switch circuits 131 is equal to a number of the first-switching circuits 122 of the plurality of power input circuits 121. An output terminal of an Nth switch circuit 131 is electrically connected with a control terminal of the Nth first-switching circuits 122, an input terminal of the Nth switch circuit 131 is electrically connected with the first to Nth power input terminals 123. The Nth switch circuit 131 is configured to receive the first electrical signal input by the Nth power input terminal 123, and control the first-switching circuit 122 electrically connected with the Nth power input terminal 123 to be turned on according to the first electrical signal to have the power supply electrically connected with the power input terminal 123 of the Nth power input circuit 121 supply power to the light source 110.

Meanwhile, the Nth switch circuit 131 is configured to receive the second electrical signal input by any one of the first to (N−1)th power input terminals 123, and control the first-switching circuit 122 electrically connected with the Nth power input terminal 123 to be turned off according to the second electrical signal, so that the power supply electrically connected with the Nth power input terminal 123 stops to supply power to the light source 110, the power supplies electrically connected with the first to (N−1)th power input terminals 123 supply power to the light source 110, to ensure the priority relationship between each power input circuit 121 of the power switching circuit 120.

Moreover, the output terminal of the Nth first-switching circuit 122 is electrically connected with input terminals of the first to (N−1)th switch circuits 131. The first to (N−1)th switch circuits 131 are configured to receive the third electrical signal output by the output terminal of the first-switching circuit 122 electrically connected with the Nth power input terminal 123, and control the first-switching circuits 122 electrically connected with the first to (N−1)th switch circuits 131 to be turned off according to the third electrical signal, so as to ensure that, when the power supply electrically connected with the Nth power input circuit 121 supplies power to the light source 110, the first-switching circuits 122 electrically connected with the first to (N−1)th power input circuits 121 to be in off states, to have the voltage input by the high priority power input terminal 123 lower than the voltage input by the low priority power input terminal 123, and when the voltage difference is smaller than the preset threshold, the first-switching circuit 122 corresponding to the high priority power input terminal 123 is in an off states and does not supply power to the lighting device 110. Thereby, after the power supply electrically connected with the Nth power input circuit 121 supplies power to the light source 110, electric current can be prevented from flowing reversely into the first to (N−1)th power input circuits 121 from the light source 110, thus the working stability of the lighting device 100 is improved.

Figure 4:
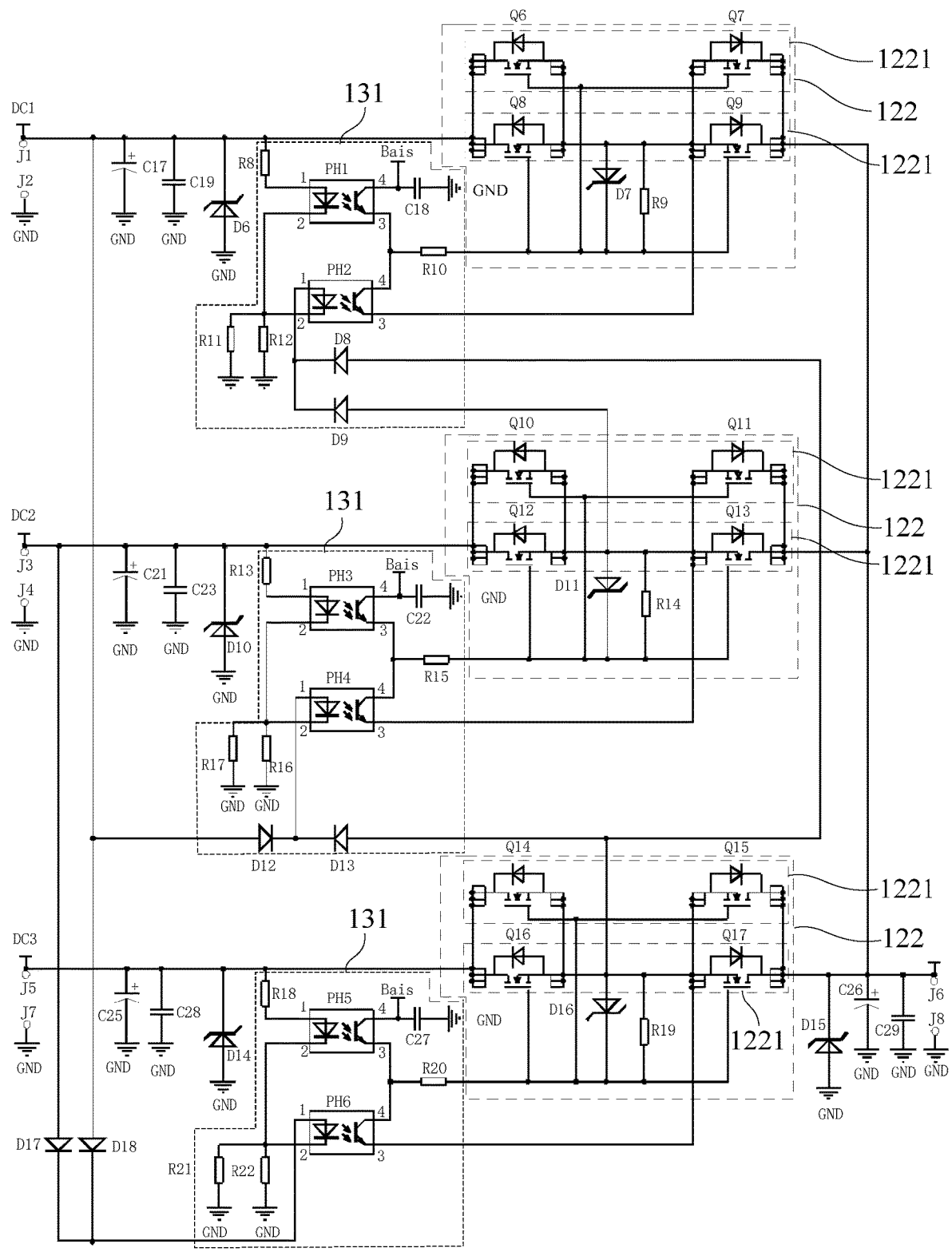
FIG. 4 is a specific circuit structural schematic diagram of a power switching circuit provided by an embodiment of the present disclosure.
Figure 5:
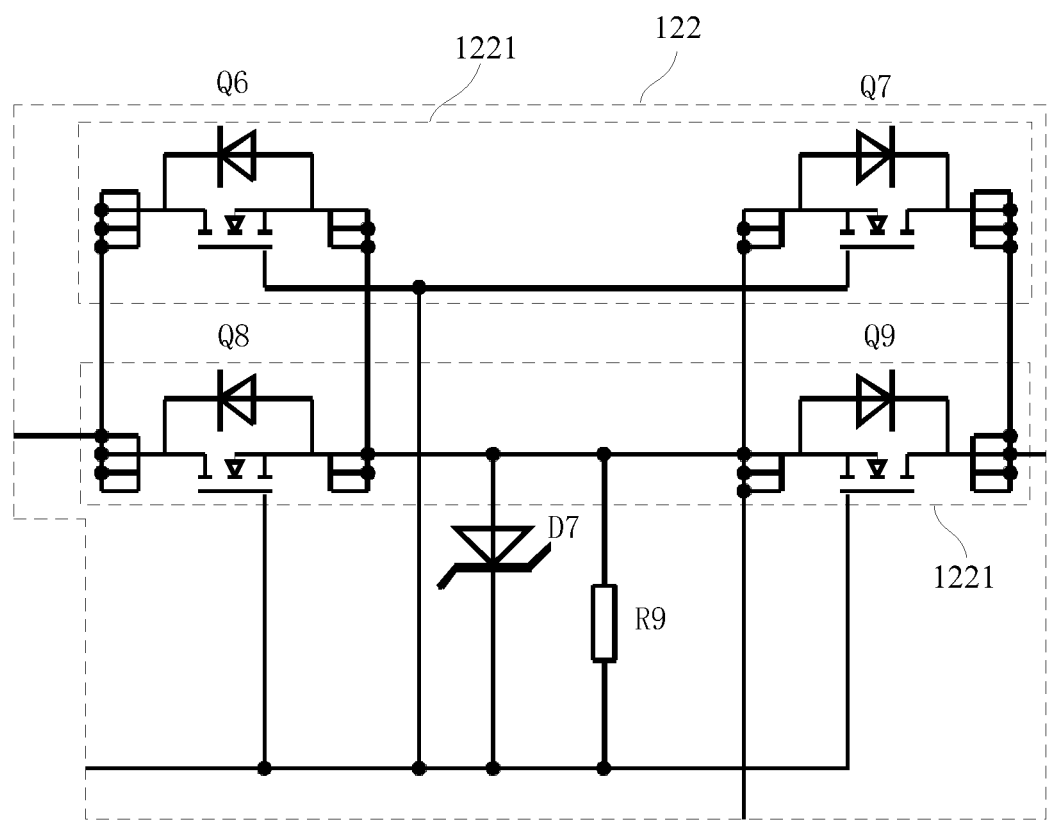
FIG. 5 is an enlarged diagram of a $1^{st}$ first-switching circuit of FIG. 4.

As is shown in FIG. 4 and FIG. 5, the first-switching circuit 122 includes a switch tube assembly 1221. The switch tube assembly 1221 may include two switch tubes (Q6, Q7). Each of the two switch tubes includes a first terminal and a second terminal. First terminals of the two switch tubes are connected with each other, and the second terminal of one of the two switch tubes is electrically connected with the corresponding power input terminal 123, and the second terminal of another of the two switch tubes is electrically connected with the light source 110 through the output terminal of the first-switching circuit 122. That is, in a same power input circuit 121, the second terminal of one switch tube of the switch tube assembly 1221 is electrically connected with the power input terminal 123, the second terminal of another switch tube is electrically connected with the light source 110, the output terminal of the switch circuit 131 is electrically connected with control terminals of the two switch tubes of the switch tube assembly 1221 to control the first terminal and the second terminal to be turned on or turned off. By controlling the output terminal of the switch circuit 131 to output corresponding electrical signal to the control terminals of the two switch tubes, turned on or turned off between the first terminals and the second terminals of the two switch tubes can be controlled. Moreover, the first-switching circuit 122 is controlled by a pure circuit structure, so that a reaction speed of the first-switching circuit 122 is faster, and operation of the first-switching circuit 122 is more stable.

Moreover, the first-switching circuit 122 may include two switch tube assemblies 1221. The two switch tube assemblies 1221 are connected in parallel with each other, that is, each switch tube of the two switch tube assemblies 1221 is electrically connected with the light source 110 and the power input terminal 123 in a same way. By connecting the two switch tube assemblies 1221 in parallel, the two switch tube assemblies 1221 can share current in high current application scenarios, reduce loss, and reduce calorific value of each switch tube, so as to improve the service lifetime of the power switching circuit 120.

Alternatively, the switch tube may include an N-type field-effect transistor (NMOSFET) tube. Of course, in some application scenarios, under the demand of high DC voltage and high DC current, it is necessary to select switch tube with high withstand voltage value and small on-resistance, since models of PMOS are few and selectivity is low, it easily causes problems of cost and type selection, therefore, in some embodiments, the switch tube can be an NMOS tube. Cost is lower for NMOS tubes and types of the NMOS tubes can be selected easily. In another embodiments, under the above inventive concept, other combinations such as PMOSFET (p-type field effect transistor) tube or transistor, and even a variety of different types of switch tubes are also feasible.

Moreover, sources of two NMOSFET tubes of the switch tube assembly 1221 are electrically connected with each other, a drain of one of the two NMOSFET tubes is electrically connected with a corresponding power input terminal 123, a drain of another one of the two NMOSFET tubes is electrically connected with the light source 110 through the output terminal of the first-switching circuit 122, gates of the two NMOSFET tubes of the switch tube assembly 1221 are electrically connected with the output terminal of a corresponding switch circuit 131. Of course, under satisfying the general concept of the present disclosure, the NMOSFET tube can also be replaced by a PMOSFET tube or a transistor.

As is shown in FIG. 4 and FIG. 5, taking the first-switching circuit 122 as an example, the first-switching circuit 122 includes a switch tube Q6, a switch tube Q7, a switch tube Q8, and a switch tube Q9. Second terminals of the switch tube Q6 and the switch tube Q8 are electrically connected with each other, and are electrically connected with a corresponding power input terminal 123 as the input terminal of the first-switching circuit 122. A first terminal of the switch tube Q6 is electrically connected with a first terminal of the switch tube Q7, a first terminal of the switch tube Q8 is electrically connected with a first terminal of the switch tube Q9, second terminals of the switch tube Q8 and the switch tube Q9 are electrically connected with each other, and are electrically connected with the light source 110 as the output terminal of the first-switching circuit 122. Control terminals of the switch tube Q6, the switch tube Q7, the switch tube Q8, and the switch tube Q9 are all electrically connected with the output terminal of a corresponding switch circuit 131.

Alternatively, as is shown in FIG. 3, FIG. 4, FIG. 6, and FIG. 7, the logic control circuit 130 further includes a bias power supply circuit 140. An input terminal of the bias power supply circuit 140 is electrically connected with the plurality of power input terminals 123. The switch circuit 131 includes a second-switching circuit 1311. The second-switching circuit 1311 includes an input terminal, a first output terminal, a second output terminal, and a control terminal. The control terminal is configured to control the input terminal to be turned on or turned off with the first output terminal and the second output terminal. The input terminal of the second-switching circuit 1311 is electrically connected with an output terminal (Bias) of the bias power supply circuit 140, the first output terminal of the second-switching circuit 1311 is electrically connected with the control terminal of a corresponding switch tube, the second output terminal of the second-switching circuit 1311 is electrically connected with the first terminal of a corresponding switch tube.

In a condition that one of the power input terminals 123 is electrically connected with power supply, the power supply can supply bias voltage for the input terminal of the second-switching circuit 1311 through the bias power supply circuit 140. When the control terminal of the second-switching circuit 1311 controls the input terminal and the first output terminal of the second-switching circuit 1311 to be turned on, the bias voltage is transmitted to the control terminal of the switch tube, so as to control the first terminal and the second terminal of the switch tube to be turned on. When the control terminal of the second-switching circuit 1311 controls the first output terminal and the second output terminal of the second-switching circuit 1311 to be turned on, the bias voltage is transmitted to the control terminal and the first terminal of the switch tube, so that the switch tube remains in an off state.

Moreover, the control terminal of the Nth second-switching circuit 1311 is electrically connected with the first to Nth power input terminals 123. The control terminal of the Nth second-switching circuit 1311 is configured to receive the first electrical signal input by the Nth power input terminal 123, and control the input terminal and the first output terminal of the Nth second-switching circuit 1311 to be turned on according to the first electrical signal, so that the bias voltage is transmitted to the control terminal of the switch tube electrically connected with the Nth power input terminal 123, to have the first terminal and the second terminal of the switch tube be turned on, so as to have the power supply electrically connected with the power input terminal 123 of the Nth power input circuit 121 supply power to the light source 110.

The control terminal of the Nth second-switching circuit 1311 is configured to receive the second electrical signal input by any one of the first to (N−1)th power input terminals 123, and control the first output terminal and the second output terminal of the Nth second-switching circuit 1311 to be turned on according to the second electrical signal, thereby, the bias voltage is transmitted to the control terminal and the first terminal of the switch tube electrically connected with the Nth power input terminal 123, and the switch tube remains in an off state, the power supply electrically connected with the power input terminal 123 of the Nth power input circuit 121 stops to supply power to the light source 110. Thereby, it is ensured that the priority of the Nth power input circuit 121 is smaller than the priority of the first to (N−1)th power input circuits 121.

Moreover, the first terminal of the of the switch tube of the Nth first-switching circuit 122 is electrically connected with the control terminals of the first to (N−1)th second-switching circuits 1311. The control terminals of the first to (N−1)th second-switching circuits 1311 are configured to receive the third electrical signal output by the first terminal the switch tube of the Nth first-switching circuit 122, and control the first output terminal and the second output terminal of the Nth second-switching circuit 1311 to be turned on according to the third electrical signal, thereby, the bias voltage is transmitted to the control terminal and the first terminal of the switch tube electrically connected with the Nth power input terminal 123, and the switch tube remains in an off state, Thereby, it can be ensured that, when the power supply electrically connected with the Nth power input circuit 121 supplies power to the light source 110, the first-switching circuit 122 electrically connected with the first to (N−1)th power supplies are in off states, so that after the power supply electrically connected with the Nth power input circuit 121 supplies power to the light source 110, the electric current is prevented from flowing reversely into the first to (N−1)th power input circuits 121 from the light source 110, thus the working stability of the lighting device 100 is improved.

As shown in FIG. 4, the second-switching circuit 1311 may include a first switch 1311*a* and a second switch 1311*b*. An input terminal of the first switch 1311*a* is electrically connected with the output terminal of the bias power supply circuit 140, an output terminal of the first switch 1311*a* is electrically connected with the control terminal of the corresponding switch tube and an input terminal of the second switch 1311*b*, an output terminal of the second switch 1311*b* is electrically connected with the first terminal of a corresponding switch tube. In a conditional that the input terminal and the output terminal of the first switch 1311*a* are turned on, the bias power supply circuit 140 supplies bias voltage for the control terminal of the switch tube through the first switch 1311*a*, so that the first terminal and the second terminal of the switch tube are turned on. In a conditional that the input terminal and the output terminal of the second switch 1311*b* are turned on, the bias power supply circuit 140 supplies bias voltage for the control terminal and the first terminal of the switch tube through the first switch 1311*a* and the second switch 1311*b* respectively, so that the switch tube is in an off state. Moreover, the second-switching circuit 1311 is controlled by a pure circuit structure, so that the reaction speed of the second-switching circuit 1311 is faster, and operation of the second-switching circuit 1311 is more stable.

Moreover, the control terminal of an Nth first switch 1311a is electrically connected with the Nth power input terminal 123. The control terminal of the Nth first switch 1311a is configured to receive the first electrical signal input by the Nth power input terminal 123, and control the input terminal and the output terminal of the Nth first switch 1311a to be turned on according to the first electrical signal, so that a bias voltage is transmitted to the control terminal of the switch tube electrically connected with the Nth power input terminal 123, to have the first terminal and the second terminal of the switch tube be turned on, so that the power supply electrically connected with the power input terminal 123 of the Nth power input circuit 121 supplies power to the light source 110.

Moreover, the control terminal of an Nth second switch 1311b is electrically connected with the first to (N−1)th power input terminals 123. The control terminal of the Nth second switch 1311b is configured to receive the second electrical signal input by any one of the first to (N−1)th power input terminals 123, and control the input terminal and the output terminal of the Nth second switch 1311b to be turned on according to the second electrical signal. Thereby, it is ensured that the priority of the Nth power input circuit 121 is smaller than the priority of the first to (N−1)th power input circuit 121.

Moreover, the second terminal of the switch tube of the Nth first-switching circuit 122 is electrically connected with the control terminals of the first to (N−1)th second switches 1311b. The control terminal of any one of the first to (N−1)th second switches 1311b is configured to receive the third electrical signal output by the first terminal of the switch tube of the Nth first-switching circuit 122, and control the output terminal and the input terminal of the any one of the control terminal of the first to (N−1)th second switch 1311b to be turned on according to the third electrical signal. Thereby, in a condition that after the power supply electrically connected with the Nth power input circuit 121 supplies power to the light source 110, the electric current is prevented from flowing reversely into the first to (N−1)th power input circuits 121 from the light source 110, so that the working stability of the lighting device 100 is improved.

It should be noted that, the Nth first switch 1311a refers to the first switch 1311a included by the Nth second-switching circuit 1311. The Nth second switch 1311b refers to the second switch 1311b included by the Nth second-switching circuit 1311.

Alternatively, the first switch 1311a may include a first optocoupler, the second switch 1311b may include a second optocoupler. An anode (pin 1) of an Nth first optocoupler is electrically connected with the Nth power input terminal 123, a cathode (pin 2) of the Nth first optocoupler is connected with earth, a collector (pin 4) of the Nth first optocoupler is electrically connected with the output terminal Bias of the bias power supply circuit 140, an emitter (pin 3) of the Nth first optocoupler is electrically connected with the control terminal of the switch tube electrically connected with the Nth power input terminal 123 and a collector of the Nth second optocoupler, an cathode of the Nth second optocoupler is connected with earth, an emitter of the Nth second optocoupler is electrically connected with the first terminal of the switch tube electrically connected with the Nth power input terminal 123, the first terminal of the switch tube electrically connected with the Nth power input terminal 123 is electrically connected with anodes of first to (N−1)th second optocouplers, the anode of the Nth second optocoupler is electrically connected with the first to (N−1)th power input terminals 123.

Figure 6:
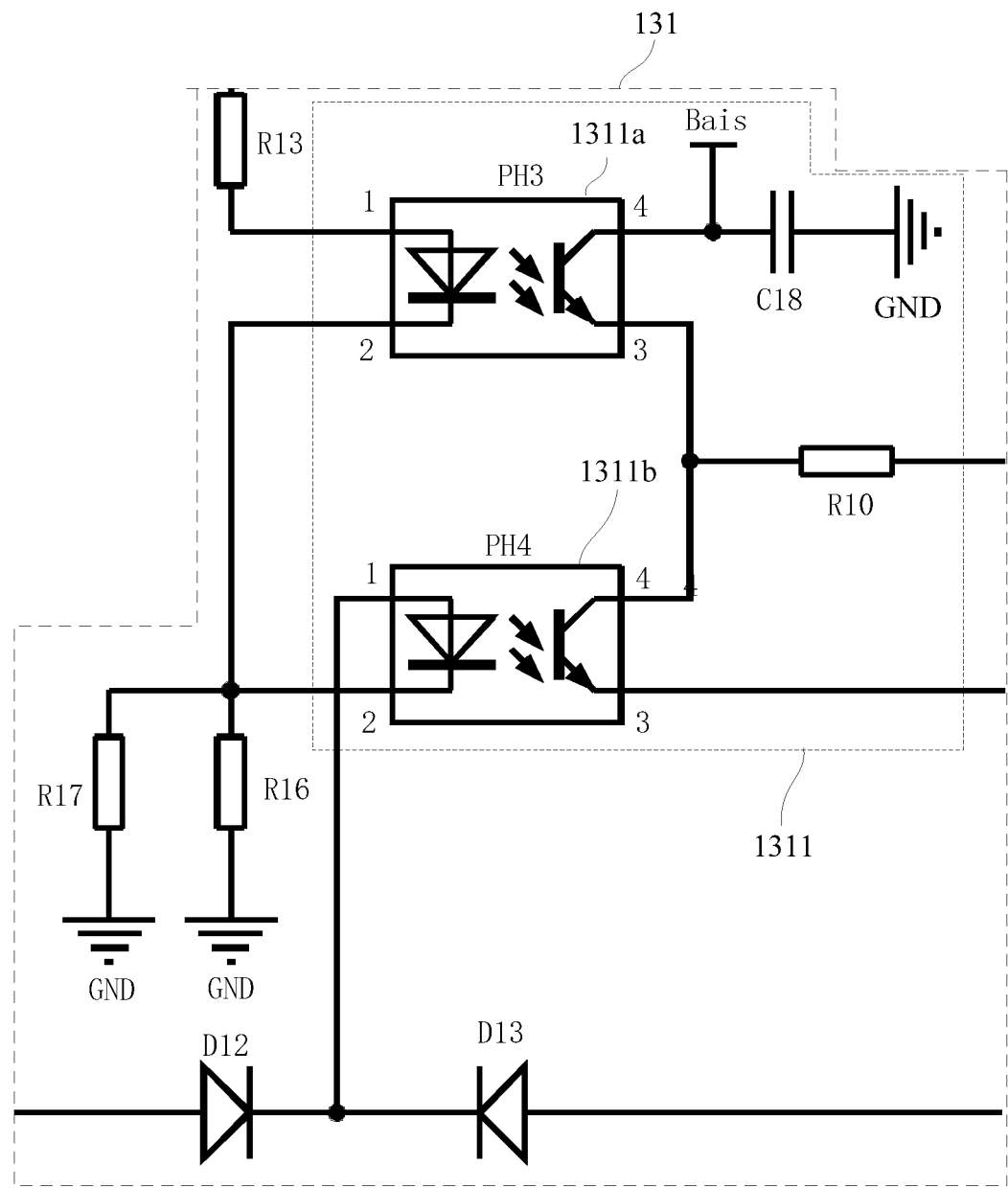
FIG. 6 is an enlarged diagram of a 2nd second-switching circuit of FIG. 4.

As is shown in FIG. 4 and FIG. 6, take the specific structure of the second-switching circuit 1311 of the second switch circuit 131 (that is, the $2^{nd}$ second-switching circuit 1311) as an example, the $2^{nd}$ second-switching circuit 1311 includes an optocoupler PH3 and an optocoupler PH4, an anode (pin 1) of the optocoupler PH3 is electrically connected with the second power input terminal 123, an cathode (pin 2) of the optocoupler PH3 is connected with earth, a collector (pin 4) of the optocoupler PH3 is electrically connected with the output terminal Bias of the bias power supply circuit 140, an emitter (pin 3) of the optocoupler PH3 is electrically connected with the gates of the switch tubes Q10, Q11, Q12, and Q13 electrically connected with the second power input terminal 123 and a collector (pin 4) of the optocoupler PH4, an anode (pin 1) of the optocoupler PH4 is electrically connected with the first terminal of the switch tube electrically connected with the third power input terminal 123 and the first power input terminal 123, a cathode (pin 2) of the optocoupler PH4 is connected with earth, an emitter (pin 3) of the optocoupler PH4 is electrically connected with the first terminal of the switch tube electrically connected with the second power input terminal 123.

Moreover, the $2^{nd}$ second-switching circuit 1311 further includes a resistor R13, a resistor R15, a resistor R16, a resistor R17, a diode D12, a diode D13, and a capacitor C22. The resistor R13 is connected in series between the anode of the optocoupler PH3 and the second power input terminal 123. The resistor R16 and the resistor R17 are connected in parallel with each other, one end of the resistor R16 and one end of the resistor R17 are connected with earth, and another end of the resistor R16 and another end of the resistor R17 are electrically connected with the cathode of the optocoupler PH3 and the cathode of the optocoupler PH4. One end of the resistor R15 is electrically connected with the emitter of the optocoupler PH3 and the collector of the optocoupler PH4, and another end of the resistor R15 is electrically connected with the gate of the switch tube electrically connected with the second power input terminal 123. A positive electrode of the diode D12 is electrically connected with the first power input terminal 123, and a negative electrode of the diode D12 is electrically connected with the anode of the optocoupler PH4. A positive electrode of the diode D13 is electrically connected with the first terminal of the switch tube electrically connected with the third power input terminal 123, and a negative electrode of the diode D13 is electrically connected with the anode of the optocoupler PH4.

Specific structures of other second-switching circuits 1311 can refer to a structure of the $2^{nd}$ second-switching circuit 1311, which will not be repeated here.

Figure 7:
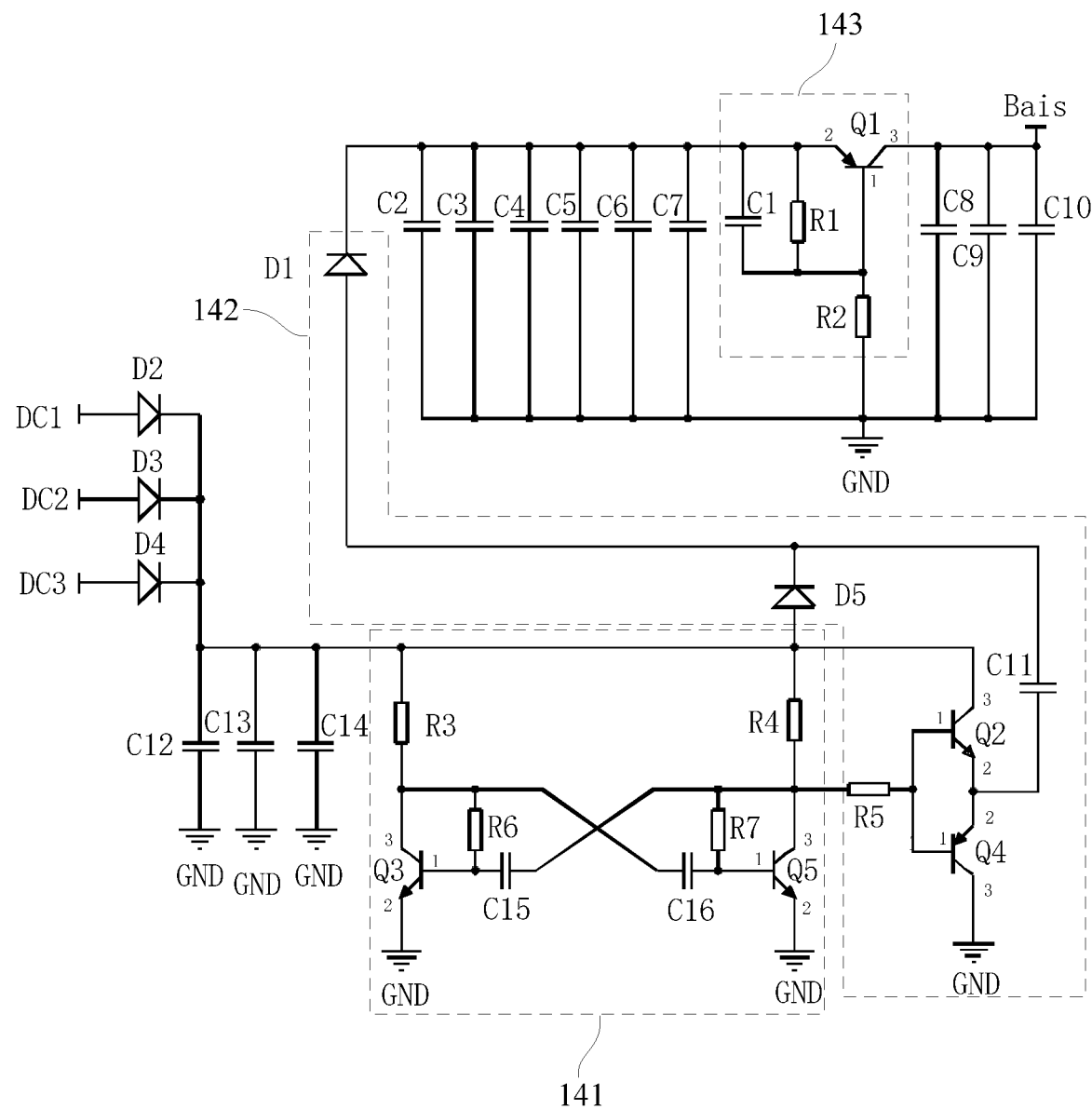
FIG. 7 is a circuit schematic diagram of a bias power supply circuit provided by an embodiment of the present disclosure.

As shown in FIG. 7, the bias power supply circuit 140 may include a monostable multivibrator circuit 141, a charge pump circuit 142, and a slow start circuit 143. An input terminal of the monostable multivibrator circuit 141 is electrically connected with the plurality of power input terminal 123, and an output terminal of the monostable multivibrator circuit 141 is electrically connected with an input terminal of the charge pump circuit 142, an output terminal of the charge pump circuit 142 is electrically connected with an input terminal of the slow start circuit 143, an output terminal of the slow start circuit 143 is electrically connected with the input terminal of the second-switching circuit 1311. The charge pump circuit 142 is configured to improve voltage, so as to have the bias power supply circuit 140 supply stable bias voltage, and to reduce cost.

Specifically, the monostable multivibrator circuit 141 includes a resistor R3, a resistor R4, a resistor R6, a resistor R7, a transistor Q3, a transistor Q5, a capacitor C15, and a capacitor C16. One end of the resistor R3 and one end of the resistor R4 are electrically connected with the plurality of power input terminals 123, another end of the resistor R3 is electrically connected with an collector of the transistor Q3, another end of the resistor R4 is electrically connected with an collector of the transistor Q5, an emitter of the transistor Q3 and an emitter of the transistor Q5 are connected with earth. One end of the resistor R6 is electrically connected with the collector of the transistor Q3, and another end of the resistor R6 is electrically connected with a base of the transistor Q3. One end of the resistor R7 is electrically connected with the collector of the transistor Q5, and another end of the resistor R7 is electrically connected with a base of the transistor Q5. The base of the transistor Q3 is electrically connected with the collector of the transistor Q5 through the capacitor C15, and the base of the transistor Q5 is electrically connected with the base of the transistor Q3 through the capacitor C16.

The charge pump circuit 142 includes a resistor R5, a transistor Q2, a transistor Q4, a capacitor C11, a diode D1, and a diode D5. A collector of the transistor Q2 is electrically connected with the plurality of power input terminals 123, an emitter of the transistor Q2 is electrically connected with a collector of the transistor Q4, an emitter of the transistor Q4 is connected with earth, a base of the transistor Q2 and a base of the transistor Q4 are electrically connected with a collector of the transistor Q5 through the resistor R5, the emitter of the transistor Q2 is electrically connected with a positive electrode of the diode D1 through the capacitor C11, a negative electrode of the diode D1 is electrically connected with the input terminal of the slow start circuit 143, a positive electrode of the diode D5 is electrically connected with the plurality of power input terminals 123, and a negative electrode of the diode D5 is electrically connected with the positive electrode of the diode D1.

The slow start circuit 143 includes a capacitor C1, a resistor R1, a resistor R2, and a transistor Q1. One end of the resistor R2 is electrically connected with a base of the transistor Q1, and the end of the resistor R2 is electrically connected with the negative electrode of the diode D1 through the resistor R1 and the capacitor C1, another end of the resistor R2 is connected with earth. A collector of the transistor Q1 is electrically connected with the negative electrode of the diode D1, and an emitter of the transistor Q1 is the output terminal Bias of the bias power supply circuit 140.

Moreover, the bias power supply circuit 140 further includes a capacitor C2, a capacitor C3, a capacitor C4, a capacitor C5, a capacitor C6, a capacitor C7, a capacitor C8, a capacitor C9, and a capacitor C10. One end of the capacitor C2, one end of the capacitor C3, one end of the capacitor C4, one end of the capacitor C5, one end of the capacitor C6, and one end of the capacitor C7 are electrically connected with the negative electrode of the diode D1, and another end of the capacitor C2, another end of the capacitor C3, another end of the capacitor C4, another end of the capacitor C5, another end of the capacitor C6, and another end of the capacitor C7 are connected with earth. One end of the capacitor C8, one end of the capacitor C9, and One end of the capacitor C10 are electrically connected with the emitter of the transistor Q1, and anther end of the capacitor C8, another end of the capacitor C9, and anther end of the capacitor C10 are connected with earth.

Alternatively, as is shown in FIG. 1, the lighting device 100 may further include a control box 150. The power switching circuit 120 can be disposed inside of the control box 150, and the control box 150 is electrically connected with the light source 110 through a wire. Specifically, a control circuit board is disposed inside of the control box 150, the power switching circuit 120 may be integrated on the control circuit board.

In other embodiments, the lighting device 100 may further include a circuit board electrically connected with the light source 110, the power switching circuit 120 may be integrated on the circuit board, so as to reduce a volume of the lighting device 100.

A working process of an embodiment of the lighting device 100 including the power switching circuit 120 is described in detail as below.

In this embodiment, as is shown in FIG. 1, and FIG. 4 to FIG. 6, the power switching circuit 120 of the lighting device 100 may include three power input circuits 121. The power input terminal 123 of the first power input circuit 121 is electrically connected with an adapter 160. The adapter 160 is configured to electrically connect with utility power. The utility power is converted to DC1 input through the adapter 160. The power input terminal 123 of the second power input circuit 121 is configured to electrically connect with a large capacity battery board (DC2), the power input terminal 123 of the third power input circuit 121 is configured to electrically connect with a small capacity battery board (DC3). The small capacity battery board may be a control box 150 hanged on the lighting device 100, or batteries installed on two sides of the lighting device 100.

In a condition that the power input terminal 123 of the first power input circuit 121 is electrically connect with the utility power, the utility power supplies bias voltage for the collector of the optocoupler PH1, the collector of the optocoupler PH3, and the collector of the optocoupler PH5 through the bias power supply circuit 140, at a same time, the utility power supplies voltage for the anode of the optocoupler PH1 to have the collector of the optocoupler PH1 and the emitter of the optocoupler PH1 be turned on, so that the bias voltage is transmitted to the control terminal of the switch tube of the $1^{st}$ first-switching circuit 122, to control the first terminal and the second terminal of the of the switch tube of the $1^{st}$ first-switching circuit 122 to be turned on, so as to have the utility power supply power to the light source 110 through the first power input circuit 121.

At a same time, the DC1 supplies power to the anode of the optocoupler PH4 and the anode of the optocoupler PH6 to have the collector and the emitter of the optocoupler PH4 be turned on, and to have the collector and the emitter of the optocoupler PH6 be turned on. Even if the large capacity battery board supplies power to the anode of the optocoupler PH3 through the second power input terminal 123 to have the collector and the emitter of the optocoupler PH3 be turned on, or, small capacity battery board supplies power to the optocoupler PH5 through the third power input circuit 121 to have the collector and the emitter of the optocoupler PH5 be turned on, it is possible to have the first terminals and the second terminals of the switch tubes of the $2^{nd}$ first-switching circuit 122 and the $3^{rd}$ first-switching circuit 122 be turned off, so that the large capacity battery board cannot supply power to the light source 110 through the second power input circuit 121, and the small capacity battery board cannot supply power to the light source 110 through the third power input circuit 121, so as to ensure that the priority of the first power input circuit 121 is higher than the priority of the second power input circuit 121 and the priority of the third power input circuit 121.

In a condition that the power input terminal 123 of the first power input circuit 121 is not electrically connected with the utility power, and the power input terminal 123 of the second power input circuit 121 is electrically connected with the large capacity battery board, the large capacity battery board supplies bias voltage for the collector of the optocoupler PH1, the collector of the optocoupler PH3, and the collector of the optocoupler PH5 through the bias power supply circuit 140, at a same time, the large capacity battery board supplies voltage for the anode of the optocoupler PH3 to have the collector and the emitter of the optocoupler PH3 be turned on, so that the bias voltage is transmitted to the control terminal of the switch tube of the $2^{nd}$ first-switching circuit 122, so as to control the first terminal and the second terminal of the switch tube of the $2^{nd}$ first-switching circuit 122 to be turned on, and to have the large capacity battery board supply power to the light source 110 through the second power input circuit 121.

At a same time, the large capacity battery board supplies power to the anode of the optocoupler PH6 to have the collector and the emitter of the optocoupler PH6 be turned on, even if the small capacity battery board supplies power to the optocoupler PH5 through the third power input circuit 121 and have the collector and the emitter of the optocoupler PH5 be turned on, it is possible to have the first terminal and the second terminal of the switch tube of the $3^{rd}$ first-switching circuit 122 be in off states, so that the small capacity battery board cannot supply power to the light source 110 through the third power input circuit 121, so as to ensure that the priority of the second power input circuit 121 is higher than the priority of the third power input circuit 121.

Moreover, the first terminal of the switch tube of the $2^{nd}$ first-switching circuit 122 may also supply power to the anode of the optocoupler PH2 to have the collector and the emitter of the optocoupler PH2 be turned on, so that the first terminal and the second terminal of the switch tube of the $1^{st}$ first-switching circuit 122 remain in off states, and the electric current supplied by the large capacity battery board through the second power input circuit 121 is prevented from flowing reversely into the first power input circuit 121. Even if after the utility power electrically connected with the power input terminal 123 of the first power input circuit 121 is converted into DC1, since the 1st first-switching circuit 122 remains disconnected, the DC1 electrically connected with the power input terminal 123 of the first power input circuit 121 cannot be transmitted to a light source end to supply power to the light source 110. That is, in a condition that, after the low priority power input circuit 121 is powered, the high priority power input circuit 121 is electrically connected with the power supply, but the voltage input by the high priority power input terminal 123 is lower than the voltage input by the low priority power input terminal 123, and the voltage difference is smaller than the preset threshold, the high priority power input circuit 121 remains disconnected and cannot supply power to the light source 110.

In a condition that the power input terminal 123 of the first power input circuit 121 is not electrically connected with the utility power, the power input terminal 123 of the second power input circuit 121 is not electrically connected with the large capacity battery board, and the power input terminal 123 of the third power input circuit 121 is electrically connected with the small capacity battery board, the small capacity battery board supplies bias voltage for the collector of the optocoupler PH1, the collector of the optocoupler PH3, and the collector of the optocoupler PH5 through the bias power supply circuit 140, at a same time, the small capacity battery board supplies voltage for the anode of the optocoupler PH5 to have the collector and the emitter of the optocoupler PH5 be turned on, so that the bias voltage is transmitted to the control terminal of the switch tube of the $3^{rd}$ first-switching circuit 122 to control the first terminal and the second terminal of the switch tube of the $3^{rd}$ first-switching circuit 122 to be turned on, and to have the small capacity battery board supply power to the light source 110 through the third power input circuit 121.

At a same time, the first terminal of the switch tube of the $3^{rd}$ first-switching circuit 122 may also supply power to the anode of the optocoupler PH2 and the anode of the optocoupler PH4 to have the collector and the emitter of the optocoupler PH2 be turned on, and to have the collector and the emitter of the optocoupler PH4 be turned on, so that the first terminals and the second terminals of the switch tubes of the $1^{st}$ first-switching circuit 122 and the $2^{nd}$ first-switching circuit 122 keep in off sates, and the electric current supplied by the small capacity battery board through the third power input circuit 121 is prevented from flowing reversely into the first power input circuit 121 or the second power input circuit 121. Even if after the utility power electrically connected with the power input terminal 123 of the first power input circuit 121 is converted into DC1, and the power input terminal 123 of the second power input circuit 121 is electrically connected with the DC2, since the switch tubes of the $1^{st}$ first-switching circuit 122 and the $2^{nd}$ first-switching circuit 122 remain in off states, the DC1 and the DC2 of the power input terminals 123 of the $1^{st}$ first-switching circuit 122 and the $2^{nd}$ first-switching circuit 122 cannot be transmitted to a power terminal. That is, in a condition that, after the low priority power input circuit 121 is powered, the high priority power input circuit 121 is electrically connected with the power supply, but the voltage input by the high priority power input terminal 123 is lower than the voltage input by the low priority power input terminal 123, and the voltage difference is smaller than the preset threshold, the high priority power input circuit 121 remains in off state and cannot supply power to the light source 110.

Figure 8:
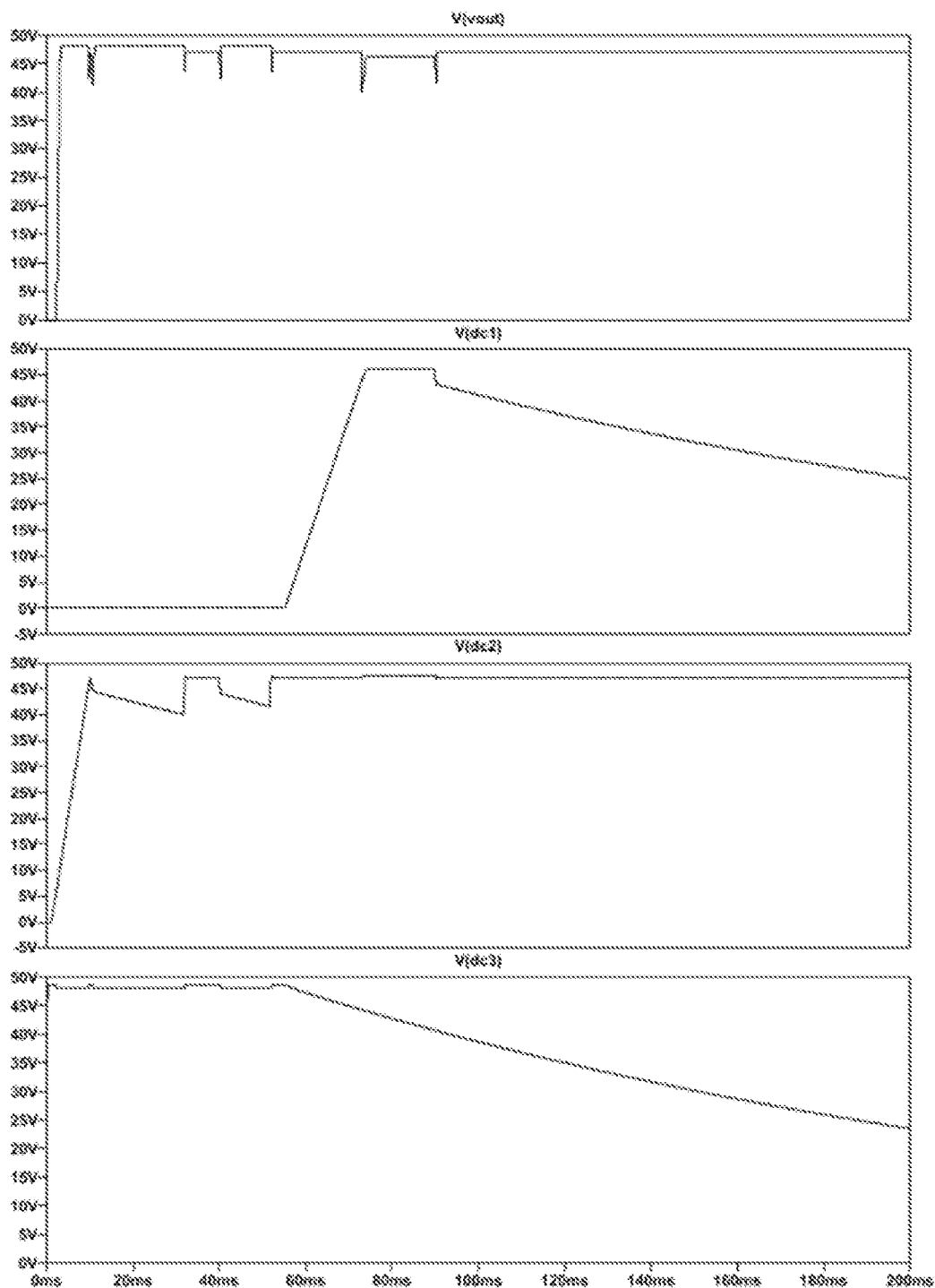
FIG. 8 is a simulation waveform diagram of switching of different power input circuits of a power switching circuit provided by an embodiment of the present disclosure.

FIG. 8 is a simulation waveform diagram of switching of different power input circuits 121 of the power switching circuit 120 provided by an embodiment of the present disclosure. As is shown in FIG. 8, at a beginning of 0ms, DC3 channel (the third power input circuit 121) has input voltage, and the DC1 channel (the first power input circuit 121) with high priority and the DC2 channel (the second power input circuit 121) with high priority have no input voltage, therefore, at this time, the first-switching circuit 122 of the DC3 channel is turned on and connected with output, that is the DC3 channel supplies power to output.

At 10 ms, the DC1 channel has no input voltage, the DC2 channel has input voltage, and the input voltage of the DC2 channel meets a switching voltage (a voltage input by a low priority channel is higher than a voltage input by a high priority channel, and a voltage difference is bigger than the preset threshold), the DC2 channel will close the first-switching circuit 122 corresponding to the lower priority DC3 channel, and then turned on the first-switching circuit 122 corresponding to the DC2 channel, that is, at this time, the DC2 channel supplies power to output.

At 10.3 ms, the DC1 channel has no input voltage, the input voltage of the DC2 channel decreases and cannot meet the switching voltage, at this time, the first-switching circuit 122 of the DC3 channel is turned on, and the first-switching circuit 122 of the DC2 channel is turned off, that is, at this time, the DC3 channel is switched to supply power to output.

At 32 ms, the DC1 channel has no input voltage, the DC2 channel has input voltage, and the input voltage meets the switching voltage, the DC2 channel can turn off the first-switching circuit 122 of the lower priority of DC3 channel, and then turn on the first-switching circuit 122 corresponding to the DC2 channel, that is, at this time, the DC2 channel supplies power to output.

At 41 ms, the DC1 channel has no input voltage, the input voltage of the DC2 channel decreases and cannot meet the switching voltage, the first-switching circuit 122 of the DC3 channel is turned on, and the first-switching circuit 122 of the DC2 channel is turned off, that is, at this time, the DC3 channel is switched to supply power to output.

At 52 ms, the DC1 channel has no input voltage, the DC2 channel has input voltage, and the input voltage meets the switching voltage, the DC2 channel can turn off the first-switching circuit 122 of the low priority DC3 channel, and then turn on the first-switching circuit 122 corresponding to the DC2 channel, that is, at this time, the DC2 channel supplies power to output.

After 52 ms, the input voltage of the DC3 channel begins to decrease, at this time, the DC1 channel has no input voltage, the DC2 channel has input voltage, and the input voltage of the DC2 channel meets the switching voltage, therefore, power failure of the DC3 channel cannot affect the DC2 channel to continue to supply power to output normally.

At 74 ms, the DC1 channel and the DC2 channel have input voltages, and the input voltages meet the switching voltage, the voltage input by the DC3 channel has dropped, because the priority of the DC1 channel is highest, so the first-switching circuits 122 of the DC2 channel and the DC3 channel are turned off, and then the DC1 channel is switched to supply power to output.

At 90 ms, the voltage input by the DC1 channel begins to decrease and is lower than the switching voltage, the DC2 channel has input voltage, and the input voltage of the DC2 channel meets the switching voltage, the input voltage of the DC3 channel has dropped, because the priority of the DC2 channel is higher than the priority of the DC3 channel, so the first-switching circuit 122 of the DC2 channel will be turned on, and the first-switching circuits 122 of the DC1 channel and the DC3 channel are turned off, that is the DC2 channel is switched to supply power to output.

It can be seen from the FIG. 8 that, the power switching circuit 120 of the lighting device 100 provided by an embodiment of the present disclosure is controlled by a pure circuit structure, thereby, reliability of the power switching circuit 120 is high, reaction speed of the power switching circuit 120 is fast, and dropping of input voltage of the power switching circuit 120 is less, so that the lighting device 100 is not prone to stroboscopic.

The present disclosure further provides a power switching circuit 120. The power switching circuit 120 includes a plurality of power input circuits 121 and a logic control circuit 130. Each of the power input circuits 121 includes a power input terminal 123 and a first-switching circuit 122. An input terminal of the first-switching circuit 122 is electrically connected with the power input terminal 123, output terminals of first-switching circuits 122 of the plurality of power input circuits 121 are electrically connected with each other. The logic control circuit 130 is electrically connected with the power input terminals 123 and the first-switching circuits 122 of the plurality of power input circuits 121. The logic control circuit 130 is configured to receive a first electrical signal input by the Nth power input terminal 123 and control the first-switching circuit 122 electrically connected with the Nth power input terminal 123 to be turned on according to the first electrical signal. The logic control circuit 130 is further configured to receive a second electrical signal input by any one of the first to (N−1)th power input terminals 123, and control the first-switching circuit 122 electrically connected with the Nth power input terminal 123 to be turned off according to the second electrical signal.

The logic control circuit 130 is further configured to receive a third electrical signal output by the output terminal of the first-switching circuit 122 electrically connected with the Nth power input terminal 123, and control the first-switching circuit 122 electrically connected with the first to (N−1)th power input terminals 123 to be turned off according to the third electrical signal. Wherein, N is a positive integer less than or equal to the number of the plurality of power input circuits 121.

Wherein, the specific structure of the logic control circuit 130 and the power input circuit 121 can refer to the above embodiments, so it will be not described one by one here.

It should be noted that, the power switching circuit 120 provided by the embodiment of the present disclosure is not limited to be used in the lighting device 100, the power switching circuit 120 can also be used in other equipment supplied by multiple types of power supplies, for example, mobile terminals such as mobile phones and laptops, recording device, or charging boxes, etc.

Figure 9:
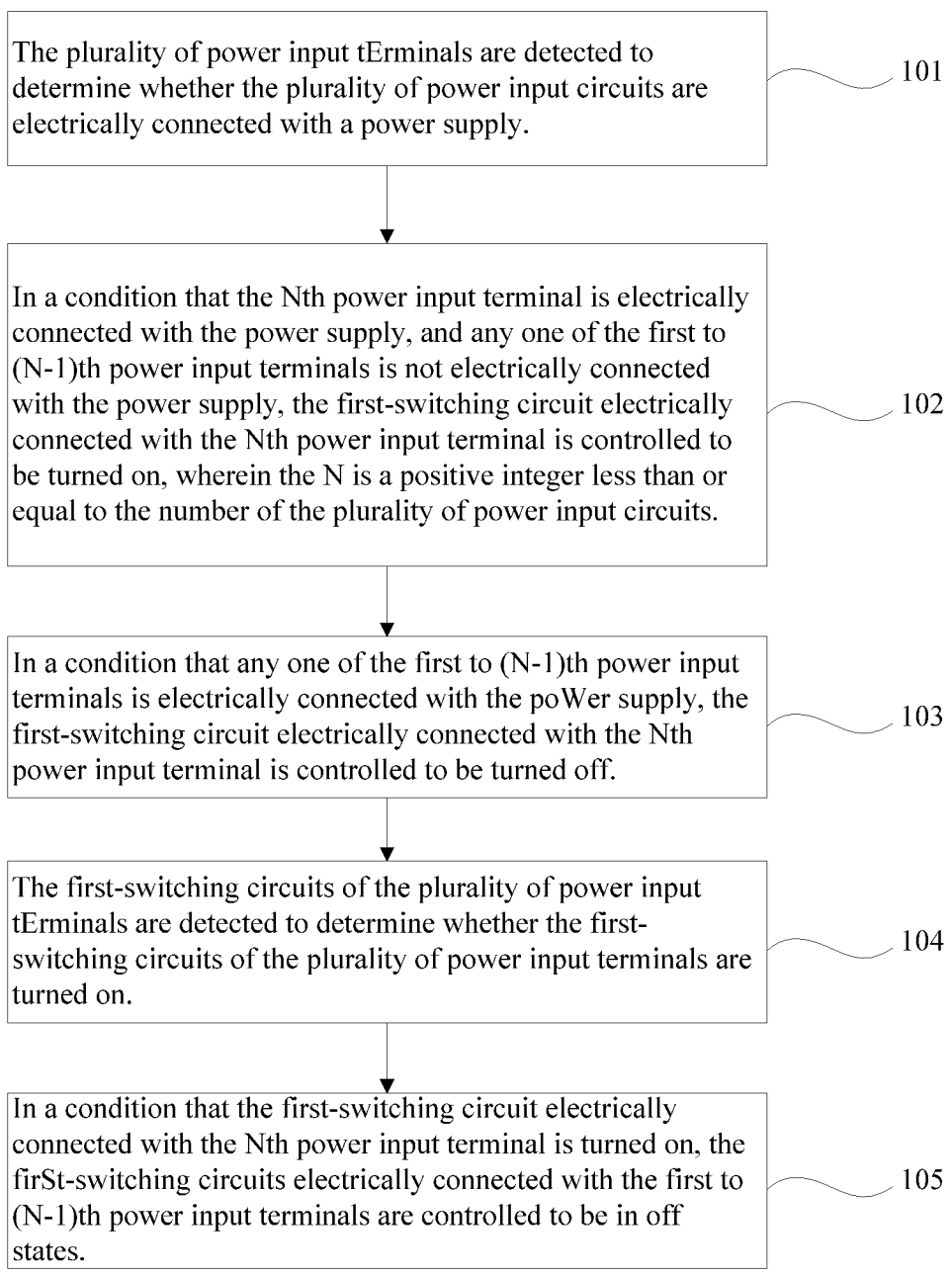
FIG. 9 is an exemplary flowchart of a power switching method of the lighting device provided by an embodiment of the present disclosure.

An embodiment of the present disclosure further provides a power switching method of a lighting device 100. The lighting device 100 includes a light source 110 and a plurality of power switching circuits 120. Each of the power switching circuits 120 includes a power input terminal 123, and a first-switching circuit 122. The first-switching circuit 122 is connected in series between the power input terminal 123 and the light source 110. As is shown in the FIG. 9, the power switching method of the lighting device 100 includes following steps:

At block 101, the plurality of power input terminals 123 are detected to determine whether the plurality of power input circuits 123 are electrically connected with a power supply.

At block 102, in a condition that the Nth power input terminal 123 is electrically connected with the power supply, and any one of the first to (N−1)th power input terminals 123 is not electrically connected with the power supply, the first-switching circuit 122 electrically connected with the Nth power input terminal 123 is controlled to be turned on, wherein the N is a positive integer less than or equal to the number of the plurality of power input circuits 121.

At block 103, in a condition that any one of the first to (N−1)th power input terminals 123 is electrically connected with the power supply, the first-switching circuit 122 electrically connected with the Nth power input terminal 123 is controlled to be turned off.

In the power switching method of the lighting device provided by the embodiment of the present disclosure, in a condition that the Nth power input terminal 123 is electrically connected with the power supply, and the first to (N−1)th power input terminals 123 are not electrically connected with the power supply, the first-switching circuit 122 electrically connected with the Nth power input terminal 123 is controlled to be turned on, and the light source 110 is powered by the power supply electrically connected with the Nth power input terminal 123. In a condition that any one of the first to (N−1)th power input terminals 123 is electrically connected with the power supply, the first-switching circuit 122 electrically connected with the Nth power input terminal 123 is controlled to be turned off according to the second electrical signal, the light source 110 is powered by the power supply electrically connected with the power input terminal 123 which input the second electrical signal, so as to ensure that after the power input terminal 123 of the high priority power input circuit 121 of the lighting device 100 is electrically connected with the power supply, the logic control circuit 130 can control the low priority power input circuit 121 to be in an off state.

Optionally, in a condition that any one of the first to (N−1)th power input terminals 123 is electrically connected with the power supply, the step that the first-switching circuit 122 electrically connected with the Nth power input terminal 123 is controlled to be turned off, includes following steps:

1031, in a condition that any one of first to (N−1)th power input terminals 123 is electrically connected with the power supply, a first voltage of the power supply electrically connected with any one of the first to (N−1)th power input terminals 123 is compared with a second voltage of the power supply electrically connected with the Nth power input terminal 123.

1032, if the first voltage is smaller than the second voltage, and a voltage difference between the first voltage and the second voltage is smaller than the preset threshold, the first-switching circuit 122 electrically connected with the Nth power input terminal 123 is controlled to be turned on.

1033, if the first voltage is bigger than the second voltage, or the first voltage is smaller than the second voltage, but the voltage difference between the first voltage and the second voltage is larger than or equal to the present threshold, the first-switching circuit 122 electrically connected with the Nth power input terminal 123 is controlled to be turned off.

Thereby, in a condition that the voltage input by the high priority power input terminal 123 is relatively low, even if the high priority power input terminal 123 is electrically connected with the power supply, the first-switching circuit 122 corresponding to the high priority power input terminal 123 is in an off state too, and does not supply power to the light source 110, while the power supply electrically connected with the low priority power input terminal 123 supplies power to the light source 110, thus further ensuring the working stability of the lighting device 100.

At block 104, the first-switching circuits 122 of the plurality of power input terminals 123 are detected to determine whether the first-switching circuits 122 of the plurality of power input terminals 123 are turned on.

At block 105, in a condition that the first-switching circuit 122 electrically connected with the Nth power input terminal 123 is turned on, the first-switching circuits 122 electrically connected with the first to (N−1)th power input terminals 123 are controlled to be in off states.

In the power switching method of the lighting device 100 provided by the embodiment of the present disclosure, in a condition that the first-switching circuit 122 electrically connected with the Nth power input terminal 123 is turned on, the first-switching circuits 122 electrically connected with the first to (N−1)th power input terminals 123 are controlled to be turned off, so as to ensure that when the power supply electrically connected with Nth power input circuit 121 supplies power to the light source 110, the first-switching circuits 122 of the first to (N−1)th power input circuits 121 are in off states, that is, after the low priority power input circuit 121 is electrically connected with the power supply and supplies power to the light source 110, the first-switching circuit 122 of the high priority power input circuit 121 is in an off state, so that when the voltage input by the high priority power input terminal 123 is lower than the voltage input by the low priority power input terminal 123, and the voltage difference is smaller than the preset threshold, the first-switching circuit 122 corresponding to the high priority power input terminal 123 is in an off state and dose not supply power to the light source 110, meanwhile, after the power supply electrically connected with the low priority power input circuit 121 supplies power to the light source, electric current is prevented from flowing reversely into the high priority power input circuit 121 from the light source 110, thus to improve the working stability of the lighting device 100.

In the above embodiments, the description of each embodiment has its own emphasis for the part not detailed in one embodiment, please refer to the relevant description of other embodiments.

The lighting device, the power switching circuit and the power switching method of the lighting device provided by the embodiments of the present disclosure is introduced in detail. In this paper, specific embodiments are applied to explain the principle and implementation mode of the present disclosure, the above description of the embodiments is only used to help understand the technical solution and its core idea of the application present disclosure. It should be understood by ordinary technicians that: they can still modify the technical solutions described in the preceding embodiments, or equivalent replace some of the technical features, these modifications and replacements do not make the essence of the corresponding technical solution out of the scope of the technical solutions of the embodiments of the present disclosure.

What is claimed is:

1. A lighting device, comprising a light source and a power switching circuit, the power switching circuit is integrated on a circuit board, wherein the power switching circuit comprises:
   a plurality of power input circuits, wherein each of the power input circuits comprises a power input terminal, and a first-switching circuit connected in series between the power input terminal and the light source; and
   a logic control circuit, wherein the logic control circuit comprises a plurality of switch circuits and a bias power supply circuit, and a number of the plurality of switch circuits is equal to a number of the plurality of first-switching circuits of the plurality of power input circuits;
   wherein an input terminal of the bias power supply circuit is electrically connected with the plurality of power input terminals, an input terminal of each of the plurality of switch circuits is electrically connected with an output terminal of the bias power supply circuit;
   wherein an output terminal of an Nth switch circuit is electrically connected with a control terminal of an Nth first-switching circuit, an input terminal of the Nth switch circuit is electrically connected with first to the Nth power input terminals;
   wherein the Nth switch circuit is configured to receive a first electrical signal input by an Nth power input terminal, and the Nth switch circuit is configured to control the first-switching circuits electrically connected with the Nth power input terminal to be turned on according to the first electrical signal;
   wherein the Nth switch circuit is further configured to receive a second electrical signal input by any one of first to (N-1)th power input terminals, and the Nth switch circuit is further configured to control the first-switching circuit electrically connected with the Nth power input terminal to be turned off according to the second electrical signal;

wherein the output terminal of the Nth switch circuit is electrically connected with input terminals of first to (N-1)th switch circuits, any one of the first to (N-1)th switch circuits is configured to receive the third electrical signal output by an output terminal of the first-switching circuit electrically connected with the Nth power input terminal, and the any one of the first to (N-1)th switch circuits is configured to control the first-switching circuits electrically connected with the first to (N-1)th switch circuits to be turned off according to the third electrical signal wherein, N is a positive integer less than or equal to the number of the plurality of power input circuits.

2. The lighting device as claimed in claim 1, wherein the first-switching circuit comprises a switch tube assembly, the switch tube assembly comprises two switch tubes, each of the two switch tubes comprises a first terminal and a second terminal, the first terminals of the two switch tubes are connected with each other, and the second terminal of one of the two switch tubes is electrically connected with a corresponding power input terminal, and the second terminal of another one of the two switch tubes is electrically connected with the light source through the output terminal of the first-switching circuit, the output terminal of the switch circuit is electrically connected with control terminals of the two switch tubes to control the first terminals and the second terminals of the two switch tubes to be turned on or turned off.

3. The lighting device as claimed in claim 2, wherein the first-switching circuit comprises two switch tube assemblies, and the two switch tube assemblies are connected in parallel with each other.

4. The lighting device as claimed in claim 2, wherein the switch tube comprises an NMOSFET tube or a PMOSFET tube.

5. The lighting device as claimed in claim 2, wherein each of the plurality of switch circuits comprises a second-switching circuit, the second-switching circuit comprises a first switch and a second switch, the first switch comprises a first optocoupler, the second switch comprises a second optocoupler, an input terminal of the first switch is electrically connected with the output terminal of the bias power supply circuit, an output terminal of the first switch is electrically connected with a control terminal of a corresponding switch tube and an input terminal of the second switch, an output terminal of the second switch is electrically connected with a first terminal of a corresponding switch tube;

a control terminal of an Nth first switch is electrically connected with the Nth power input terminal, the control terminal of the Nth first switch is configured to receive the first electrical signal and control an input terminal and an output terminal of the Nth first switch to be turned on according to the first electrical signal;

an control terminal of an Nth second switch is electrically connected with the first to (N-1)th power input terminals, the control terminal of the Nth second switch is configured to receive a second electrical signal and control an input terminal and an output terminal of the Nth second switch to be turned on according to the second electrical signal;

the second terminal of the switch tube of the Nth first-switching circuit is electrically connected with control terminals of first to (N-1)th second switches, a control terminal of any one of the first to (N-1)th second switches is configured to receive the third electrical signal and control an output terminal and an input terminal of the any one of the control terminal of the first to (N-1)th second switch to be turned on according to the third electrical signal.

6. The lighting device as claimed in claim 5, wherein the bias power supply circuit comprises a monostable multivibrator circuit, a charge pump circuit, and a slow start circuit, an input terminal of the monostable multivibrator circuit is electrically connected with the plurality of power input terminal, and an output terminal of the monostable multivibrator circuit is electrically connected with an input terminal of the charge pump circuit, an output terminal of the charge pump circuit is electrically connected with an input terminal of the slow start circuit, an output terminal of the slow start circuit is electrically connected with the input terminal of the second-switching circuit.

7. The lighting device as claimed in claim 5, wherein the first switch include a first optocoupler, the second switch include a second optocoupler, an anode of an Nth first optocoupler is electrically connected with the Nth power input terminal, a cathode of the Nth first optocoupler is connected with earth, a collector of the Nth first optocoupler is electrically connected with the output terminal Bais of the bias power supply circuit, an emitter of the Nth first optocoupler is electrically connected with the control terminal of the switch tube electrically connected with the Nth power input terminal and a collector of the Nth second optocoupler, an cathode of the Nth second optocoupler is connected with earth, an emitter of the Nth second optocoupler is electrically connected with the first terminal of the switch tube electrically connected with the Nth power input terminal, the first terminal of the switch tube electrically connected with the Nth power input terminal is electrically connected with anodes of first to (N-1)th second optocouplers, the anode of the Nth second optocoupler is electrically connected with the first to (N-1)th power input terminals.

8. The lighting device as claimed in claim 1, wherein the logic control circuit provided by an embodiment of the present disclosure can have the plurality of the power input circuits have a priority relationship between each other, and the priority relationship is: the first power input circuit >the second power input circuit >the third power input circuit > . . . >the Nth power input circuit.

9. The lighting device as claimed in claim 8, wherein in a condition that if the low priority power input circuit is turned on to supply power to the light source, a voltage input by the high priority power input circuit is lower than a voltage input by the low priority power input circuit, and a voltage difference is smaller than the preset threshold, the first-switching circuits corresponding to the high priority power input circuit is in an off state, and does not supply power to the light source.

10. The lighting device as claimed in claim 1, wherein the logic control circuit is further configured to compare the second electrical signal with the first electrical signal, in a condition that the second electrical signal is smaller than the first electrical signal, and a difference between the second electrical signal and the first electrical signal is larger than a preset threshold, the logic control circuit controls the first-switching circuit electrically connected with the Nth power input terminal to be turned off, otherwise, the logic control circuit controls the first-switching circuit electrically connected with the Nth power input terminal to remain in a conducting state.

11. The lighting device as claimed in claim 1, wherein sources of two switch tubes of the switch tube assembly are electrically connected with each other, a drain of one of the two switch tubes is electrically connected with a corresponding power input terminal, a drain of another one of the two switch tubes is electrically connected with the light source through the output terminal of the first-switching circuit, gates of the two NMOSFET tubes of the switch tube assembly are electrically connected with the output terminal of a corresponding switch circuit.

12. The lighting device as claimed in claim 1, wherein in a condition that the control terminal of the second-switching circuit controls the input terminal and the first output terminal of the second-switching circuit to be turned on, the bias voltage is transmitted to the control terminal of the switch tube, to control the first terminal and the second terminal of the switch tube to be turned on, in a condition that the control terminal of the second-switching circuit controls the first output terminal and the second output terminal of the second-switching circuit to be turned on, the bias voltage is transmitted to the control terminal and the first terminal of the switch tube, the switch tube remains in an off sate.

13. The lighting device as claimed in claim 1, wherein the plurality of power input circuits are electrically connected with a plurality of power supplies, and each power input terminal is electrically connected with one of the plurality of power supplies.

14. The lighting device as claimed in claim 13, wherein the plurality of power supplies are multiple types of power supplies, and the multiple types of power supplies are a utility power, a large capacity battery board or a small capacity battery board.

15. A power switching circuit, the power switching circuit is integrated on a circuit board, wherein the power switching circuit comprises:
 a plurality of power input circuits, wherein each of the power input circuits comprises a power input terminal and a first-switching circuit, an input terminal of the first-switching circuit is electrically connected with the power input terminal, output terminals of the first-switching circuits of the plurality of power input circuits are electrically connected with each other; and
 a logic control circuit, wherein the logic control circuit comprises a plurality of switch circuits and a bias power supply circuit, and a number of the plurality of switch circuits is equal to a number of the plurality of first-switching circuits of the plurality of power input circuits;
 wherein an input terminal of the bias power supply circuit is electrically connected with the plurality of power input terminals, an input terminal of each of the plurality of switch circuits is electrically connected with an output terminal of the bias power supply circuit;
 wherein an output terminal of an Nth switch circuit is electrically connected with a control terminal of an Nth first-switching circuit, an input terminal of the Nth switch circuit is electrically connected with first to the Nth power input terminals;
 wherein the Nth switch circuit is configured to receive a first electrical signal input by an Nth power input terminal, and the Nth switch circuit is configured to control the first-switching circuits electrically connected with the Nth power input terminal to be turned on according to the first electrical signal;
 wherein the Nth switch circuit is further configured to receive a second electrical signal input by any one of first to (N−1)th power input terminals, and the Nth switch circuit is further configured to control the first-switching circuit electrically connected with the Nth power input terminal to be turned off according to the second electrical signal;
 wherein the output terminal of the Nth switch circuit is electrically connected with input terminals of first to (N−1)th switch circuits, any one of the first to (N−1)th switch circuits is configured to receive the third electrical signal output by an output terminal of the first-switching circuit electrically connected with the Nth power input terminal, and the any one of the first to (N−1)th switch circuits is configured to control the first-switching circuits electrically connected with the first to (N−1)th switch circuits to be turned off according to the third electrical signal;
 wherein N is a positive integer less than or equal to the number of the plurality of power input circuits.

16. The power switching circuit as claimed in claim 15, wherein the first-switching circuit comprises a switch tube assembly, the switch tube assembly comprises two switch tubes, each of the two switch tubes comprises a first terminal and a second terminal, the first terminals of the two switch tubes are connected with each other, and the second terminal of one of the two switch tubes is electrically connected with a corresponding power input terminal, and the second terminal of another one of the two switch tubes is electrically connected with a light source through the output terminal of the first-switching circuit, the output terminal of the switch circuit is electrically connected with control terminals of the two switch tubes to control the first terminals and the second terminals of the two switch tubes to be turned on or turned off.

17. The power switching circuit as claimed in claim 16, wherein the first-switching circuit comprises two switch tube assemblies, and the two switch tube assemblies are connected in parallel with each other.

18. The power switching circuit as claimed in claim 16, wherein the switch tube comprises an NMOSFET tube or a PMOSFET tube.

19. The power switching circuit as claimed in claim 16, wherein each of the plurality of switch circuits comprises a second-switching circuit, the second-switching circuit comprises a first switch and a second switch, the first switch comprises a first optocoupler, the second switch comprises a second optocoupler, an input terminal of the first switch is electrically connected with the output terminal of the bias power supply circuit, an output terminal of the first switch is electrically connected with a control terminal of a corresponding switch tube and an input terminal of the second switch, an output terminal of the second switch is electrically connected with a first terminal of a corresponding switch tube;
 a control terminal of an Nth first switch is electrically connected with the Nth power input terminal, the control terminal of the Nth first switch is configured to receive the first electrical signal and control an input terminal and an output terminal of the Nth first switch to be turned on according to the first electrical signal;
 an control terminal of an Nth second switch is electrically connected with the first to (N−1)th power input terminals, the control terminal of the Nth second switch is configured to receive a second electrical signal and control an input terminal and an output terminal of the Nth second switch to be turned on according to the second electrical signal;

the second terminal of the switch tube of the Nth first-switching circuit is electrically connected with control terminals of first to (N−1)th second switches, a control terminal of any one of the first to (N−1)th second switches is configured to receive the third electrical signal and control an output terminal and an input terminal of the any one of the control terminal of the first to (N−1)th second switch to be turned on according to the third electrical signal.

20. The power switching circuit as claimed in claim 19, wherein the bias power supply circuit comprises a monostable multivibrator circuit, a charge pump circuit, and a slow start circuit, an input terminal of the monostable multivibrator circuit is electrically connected with the plurality of power input terminal, and an output terminal of the monostable multivibrator circuit is electrically connected with an input terminal of the charge pump circuit, an output terminal of the charge pump circuit is electrically connected with an input terminal of the slow start circuit, an output terminal of the slow start circuit is electrically connected with the input terminal of the second-switching circuit.

\* \* \* \* \*